(12) United States Patent
Holt et al.

(10) Patent No.: US 8,972,067 B2
(45) Date of Patent: Mar. 3, 2015

(54) SYSTEM AND METHOD FOR OPTIMIZING PLANT OPERATIONS

(75) Inventors: Joel Donnell Holt, Scotia, NY (US); Richard Lee Nichols, Simpsonville, SC (US); Frederick William Block, Campobello, SC (US); Michael Joseph Alexander, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 13/105,781

(22) Filed: May 11, 2011

(65) Prior Publication Data

US 2012/0290104 A1 Nov. 15, 2012

(51) Int. Cl.
*G05D 17/00* (2006.01)
*G06F 11/30* (2006.01)
*G06Q 10/00* (2012.01)

(52) U.S. Cl.
CPC ..................................... *G06Q 10/00* (2013.01)
USPC ............................ 700/286; 700/287; 702/184

(58) Field of Classification Search
None
See application file for complete search history.

(56) References Cited

U.S. PATENT DOCUMENTS

| | | | |
|---|---|---|---|
| 6,968,259 B2 | 11/2005 | Simons et al. | |
| 7,213,009 B2 | 5/2007 | Pestotnik et al. | |
| 7,239,977 B2 | 7/2007 | Fantana et al. | |
| 7,474,988 B2 | 1/2009 | Kamisuwa et al. | |
| 7,505,918 B1 | 3/2009 | Spielmann et al. | |
| 7,603,283 B1 | 10/2009 | Spielmann et al. | |
| 7,606,673 B2 | 10/2009 | Judd | |
| 7,644,005 B1 | 1/2010 | Billiotte et al. | |
| 7,657,480 B2 | 2/2010 | Harper et al. | |
| 7,677,089 B2 | 3/2010 | Block et al. | |
| 7,716,971 B2 | 5/2010 | Block et al. | |
| 7,778,856 B2 | 8/2010 | Reynolds et al. | |
| 8,707,773 B2 * | 4/2014 | Blossfeld et al. | 73/114.55 |
| 2003/0225706 A1 * | 12/2003 | Bookstaber | 705/64 |
| 2004/0019397 A1 * | 1/2004 | Sollner | 700/97 |
| 2005/0027374 A1 * | 2/2005 | Van Dyk et al. | 700/21 |
| 2005/0075970 A1 * | 4/2005 | Doyle | 705/38 |
| 2006/0100915 A1 * | 5/2006 | Fujiyama et al. | 705/7 |
| 2006/0178762 A1 * | 8/2006 | Wroblewski et al. | 700/30 |
| 2007/0150333 A1 * | 6/2007 | Hurst et al. | 705/10 |
| 2008/0021604 A1 | 1/2008 | Bouvier et al. | |
| 2008/0288321 A1 * | 11/2008 | Dillon et al. | 705/9 |
| 2009/0076873 A1 | 3/2009 | Johnson et al. | |
| 2009/0094080 A1 * | 4/2009 | Luotojarvi | 705/7 |
| 2009/0138316 A1 | 5/2009 | Weller et al. | |
| 2009/0265200 A1 | 10/2009 | Boswell et al. | |
| 2009/0265209 A1 | 10/2009 | Swaminathan et al. | |
| 2009/0319312 A1 | 12/2009 | Moerdler et al. | |

FOREIGN PATENT DOCUMENTS

WO 2007028158 A2 3/2007

OTHER PUBLICATIONS

Search Report and Written Opinion from corresponding EP Application No. 12167221.6-2221 dated Sep. 28, 2012.
"Notice From the European Patent Office Dated Oct. 1, 2007 Concerning Business Methods", pp. 592-593, Nov. 1, 2007.

* cited by examiner

*Primary Examiner* — Sean Shechtman
(74) *Attorney, Agent, or Firm* — Fletcher Yoder P.C.

(57) ABSTRACT

Embodiments of the present disclosure include systems and a method. In one embodiment, a system is provided. The system includes a risk calculation system configured to calculate a risk based on a static input and a dynamic input, and a decision support system configured to use the risk to derive a decision. The system also includes a plant control system configured to update operations of a plant based on the decision, wherein the decision predicts future plant conditions.

22 Claims, 14 Drawing Sheets

SYSTEM AND METHOD FOR OPTIMIZING PLANT OPERATIONS

BACKGROUND

The present disclosure relates to operations of an industrial plant, and more particularly to systems and methods for optimizing the operations of the industrial plant.

An industrial plant, such as a power generation plant, includes a plurality of interrelated equipment and processes. For example, power generation plants may include turbine systems and processes for operating and maintaining the turbine systems. During plant operations, the equipment and processes generate dynamic data that may detail conditions throughout the plant. For example, a turbine system may generate data representative of the operational conditions found in the turbine system. Likewise, static data may be available, such as design data for the plant. It would be beneficial to use the dynamic inputs and the static data to improve equipment utilization and lower resource downtime.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment of the present disclosure, a system is provided. The system includes a risk calculation system configured to calculate a risk based on a static input and a dynamic input, and a decision support system configured to use the risk to derive a decision. The system also includes a plant control system configured to update operations of a plant based on the decision, wherein the decision predicts future plant conditions.

In a second embodiment of the present disclosure, a method is provided. The method includes determining an occurrence of an event based on an event rule and a dynamic input associated with components of a plant. The method also includes responding to the occurrence of the event, if the event occurs. The responding includes updating a risk projection based on at least one dynamic input, updating a risk threshold based on at least one static input, determining whether the risk projection exceeds the risk threshold, and determining a first action if the risk projection exceeds the risk threshold. The determining the first action includes selecting a mitigation action as the first action if one or more mitigation actions are available, or determining a recommended action as the first action if no mitigation actions are available. The method also includes determining a second action if the risk projection does not exceed the risk threshold. The determining the second action includes calculating a next scheduled action as the second action.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE DISCLOSURE

Figure 1:
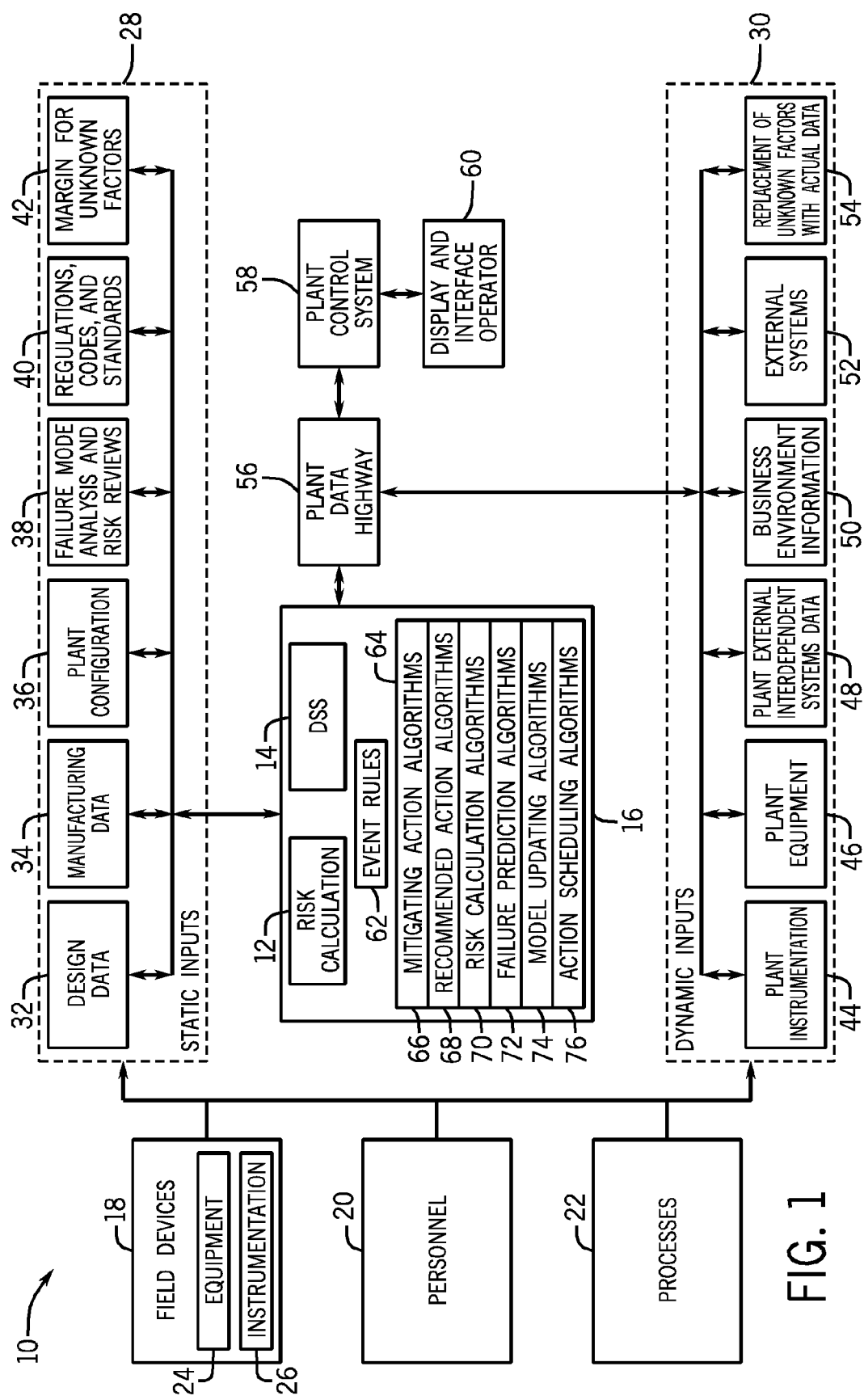
FIG. 1 is a block diagram illustrating an embodiment of an industrial plant.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of industrial plants, including but not limited to power plants, chemical plants, manufacturing plants, oil refineries, and the like. Industrial plants may include a variety of equipment and processes useful in providing a variety of operations and services. For example, power plant equipment or machinery may provide operations suitable for producing power. Likewise, chemical processing machinery may provide operations useful in the manufacturing and/or processing of chemicals. Similarly, manufacturing machinery may provide operations suitable for making or otherwise reshaping physical items.

Industrial plants may also include processes useful in plant operations. For example, maintenance processes may be in place suitable for optimizing the life and the performance of plant equipment. Business processes may also be used, for example, to calculate plant parameters such as a current quantity of desired power production based on market conditions. Additionally, processes related to state and federal regulations, codes, and/or standards (e.g., industry standards) may be used to derive operational parameters such as emission levels, testing intervals, reporting requirements, and so forth. The industrial equipment and processes may generate data that may be generally categorized as dynamic data and static data. Dynamic data may include data generated during plant operations, for example, data generated through the use of plant instrumentation such as sensor instrumentation. Static data may include data generally determined during plant construction, and may be modified infrequently. For example, static data may include plant design data and current plant configuration data, as described in more detail with respect to FIG. 1.

By using the systems and methods described herein, the dynamic data and the static data may be combined so as to derive information useful in optimizing plant operations. In one embodiment, a risk calculation engine may be combined with decision support system (DSS). The risk calculation engine may calculate a risk and the DSS may use the risk to derive one or more decisions useful in optimizing plant operations. For example, a risk of equipment failure may be calculated by the risk calculation engine based on the dynamic and the static data. The derived risk may then be input into the DSS, and the DSS may then derive operational decisions, such as risk mitigation decisions and recommended actions, that may result in a more efficient plant operation. A method is also provided that may enable a continuous monitoring of the dynamic and the static inputs, so as to update risk projections and/or risk thresholds associated with plant equipment and operations. The risk projections and/or thresholds may then be used to derive actions suitable for improving the use of the equipment and increasing plant reliability and efficiency, as described in more detail with respect to FIG. 3. Indeed, the method may be applied to a number of aspects of plant equipment and plant operations, as described in more detail with respect to FIGS. 4-14.

Turning now to the figures, FIG. 1 is a block diagram of an embodiment of a plant 10, including a risk calculation engine 12 and a DSS 14. In the depicted embodiment, the risk calculation engine 12 and the DSS 14 are hosted by a control computer 16. The risk calculation engine 12, the DSS 14, and the control computer 16 may include non-transient machine readable media storing code or computer instructions that may be used by a computing device to implement the techniques disclosed herein. It is to be noted that, in other embodiments, the risk calculation engine 12 and the DSS 14 may be hosted in separate control computers 16 or in a system of distributed computers (e.g., "cloud" computing). The plant 10 includes one or more field devices 18, plant personnel 20, and/or plant processes 22. The field devices 18 may include a plurality of plant equipment 24 and plant instrumentation 26. For example, the plant equipment 24 may include turbine systems (e.g., steam turbines, gas turbines, hydroelectric turbines, wind turbines), generators, expanders, pumps, compressors, valves, electrical systems, chemical reactors, gasifiers, gas treatment systems (e.g., acid gas removal. systems) air separation units, (ASU), boilers, furnaces, water treatment systems, heat recovery steam generator (HRSG) systems, vats, conveyor belt systems, conduits, milling machines, forging equipment, casting equipment and the like, useful in operating the industrial plant 10. The plant instrumentation 26 may include, for example, pressure sensors, temperature sensors, flow sensors, status and position indicators (e.g. limit switches, Hall effect switches, acoustic proximity switches, linear variable differential transformers (LVDTs), position transducers), and the like.

The field devices 18, personnel 20, and/or processes 22 may produce data generally categorized as static inputs 28 or dynamic inputs 30. The static inputs 28 may include data created during construction of the plant 10 and may be modified infrequently, while the dynamic inputs 30 may include data produced during plant operations. For example, the static inputs 28 may include design data 32, manufacturing data 34, plant configuration data 36, failure mode analysis and risk review data 38, federal and state regulations, codes and standards data 40, and margin for unknown factors data 42. The design data 32 may include data related to the design of the plant 10, such as process flowcharts detailing plant processes (e.g., mechanical process, chemical processes, power production processes, manufacturing processes, maintenance processes), data detailing plant capabilities (e.g., power production output in megawatts, chemical production capabilities, refining capabilities, manufacturing capabilities), data detailing equipment and instrumentation capabilities, and so forth.

The manufacturing data 34 may include data related to the fabrication of the plant 10, such as any deviations from the plant design, bill of materials (BOMs) for the plant and equipment, and so on. Plant configuration data 36 may include data related to how the plant 10 is currently set up or arranged for operations, and includes data such as the field devices 18 used in operations, spare equipment 24 and spare instrumentation 26, list of personnel 20, personnel 20 qualifications, processes 22 used (e.g., ISO-9000 processes, maintenance processes, operational processes, safety processes), and the like. Failure mode analysis and risk reviews data 38 may include data useful in deriving certain risks associated with plant operations. For example, the failure mode analysis and risk reviews data 38 may include physics-based models, such as such as low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models that may be used to predict the risk of equipment malfunction or the need for equipment maintenance.

The failure mode analysis and risk reviews data 38 may also include statistical models, such as regression analysis models, data mining models (e.g., clustering models, classification models, association models), and the like. For example, clustering techniques may discover groups or structures in the data that are in some way "similar." Classification techniques may classify data points as members of certain groups, for example, field devices 18 having a higher probability of encountering an unplanned maintenance event. Regression analysis may be used to find functions capable of modeling future trends within a certain error range. Association techniques may be used to find relationship between variables. For example, using associative rule learning techniques may lead to associating certain cold start procedures with increased blade wear in a turbine system.

The regulations, codes, and standards data 40 may include data useful in maintaining compliance with federal and state law as well as upholding industrial standards. For example, federal and state regulations, codes, and permitting requirements related to plant emissions, plant safety, types of fuel used, maximum achievable control technologies (MACT), plant operations, and/or personnel may be included as data 40. The margin for unknown factors data 42 may include, for example, data related to the addition of safety margins or to accommodate unknown factors. That is, the data 42 may include additional safety margin data suitable for enhancing safety operations, risk margin data suitable for lowering the occurrence of certain risks (e.g., equipment failure risks), and/or data generally suitable for accommodating the occurrence of unknown factors that may adversely impact plant 10 operations.

The dynamic data 30 may include plant instrumentation data 44, plant equipment data 46, plant external interdependent systems data 48, business environment data 50, external systems data 52, and/or replacement of unknown factors with actual data 54. The plant instrumentation data 44 may include measurements and derivations based on the instrumentation 26. For example, the data 44 may include temperature measurements, pressure measurements, flow measurements, clearance measurements (e.g., measuring distances between a rotating component and a stationary component), vibration measurements, position measurements, chemical measurements, power production measurements, exhaust emissions measurements, stress or strain measurements, leakage measurements, speed measurements, and so forth. The plant equipment data 46 may include data related to individual equipment 24. For example, the data 46 may include operating conditions of the equipment 24 (e.g., speed, temperature, pressure, vibration, flow, fuel consumption, power production, clearance), maintenance history (e.g., maintenance logs), performance history (e.g., power production logs), and the like.

The plant external interdependent systems data 48 may include data related to external systems, such as other plants 10 (e.g., power plants, chemical plants, refineries, manufacturing plants), that may be interrelated or interdependent with the depicted industrial plant 10. Such data 48 may include power grid information, fuel supply information (e.g., gas supply, feedstock supply, oil supply), water supply information, raw material supply information, and so forth. The business environment data 50 may include data associated with economic and business conditions that may impact the plant 10. For example, the data 50 may include market data for the demand and supply of electrical power, manufactured goods, fuel, raw materials (e.g., metals, chemicals), and/or processed materials (e.g., processed chemicals, refined oil). Further, the data 50 may include data related to futures market, e.g., sales of future power output, future commodities, future raw material, and the like. Additionally, the data 50 may include supply and demand data in regulatory markets, such as cap and trade markets (i.e., emissions markets). Further, the data 50 may include business data related to tax credits for emission controls, tax credits for the use of certain technologies (e.g., carbon capture technologies, carbon sequestration technologies), regulatory costs related to the emissions of certain chemicals (e.g., sulfur emissions, $CO_2$ emissions), and so forth. The external systems data 52 may include data from external systems such as weather prediction systems, maintenance systems (e.g., electronic maintenance logs), and so forth.

The dynamic inputs 30 may be sampled at a variety of sample rates, such as approximately every 250 milliseconds, 1 second, 10 seconds, 1 hour, 1 week, 1 month. The dynamic inputs 30 may be then transferred to the control computer 16 by using, for example, a plant data highway 56. The plant data highway 56 may include networking equipment, such as a wireless router, a modem, an Ethernet card, a gateway, or the like, suitable for transmitting the dynamic inputs 30 to the control computer 16. The plant data highway 56 may also be used to communicatively connect the control computer 16 to a plant control system 58. The plant control system 58 may include a distributed control system (DCS), a manufacturing execution system (MES), a supervisor control and data acquisition (SCADA) system, and/or a human machine interface (HMI) system. Accordingly, the plant control system 58 may provide inputs to the control computer 16, such as current control settings and alarms. Additionally, the control computer 16 may transmit instructions to the plant control system 58 suitable for implementing plant 10 control actions, as described in more detail below with respect to FIGS. 3-14.

A display and interface system 60 may enable an operator to interact with the plant control system 58, the control computer 16 and other plant 10 components. For example, the display and interface system 60 may include screens suitable for entering information and displaying a variety of data, including the dynamic inputs 30 and the static inputs 32. In certain embodiments, the display and interface system 60 may enable remote access to the various components of the plant 10, such as internet or web access. Indeed, the display and interface system 60 may enable a local or remote access to a variety of components of the plant 10, including the field devices 18, the control computer 16, and the plant control system 58.

The display and interface system 60 may provide visualizations showing scheduled actions for monitored processes, maintenance schedules, process maps or flowcharts, and actions derived by the control computer 16. Additionally, the display and interface system 60 may provide data associated with the derived actions, such as changes to recommended maintenance schedules, risk mitigation actions, automatic and manual actions, data associated with the inputs 28 and 30, and data associated with the risk calculation engine 12 and DSS 14.

The control computer 16 may further include multiple event rules 62 and algorithms 64 that may be used by the risk calculation engine 12 and the DSS 14 to derive a more optimal utilization of the plant's 10 resources, including field devices 18 and personnel 20. For example, the event rules 62 may be used to detect one or more plant 10 events, and the events may then be used to select one or more of the algorithms 64. The algorithms 64 may include mitigation action algorithms 66 suitable for deriving actions useful in mitigating, for example, risks of equipment 24 and/or instrumentation 26 malfunctioning, as well as mitigating the impact of unreliable equipment 24 and/or instrumentation 26.

The algorithms 64 may also include recommended action algorithms 68 suitable for recommending actions that may be useful in responding to various plant 10 conditions. Risk calculation algorithms 70 may also be used, that enable the calculation of various risk, by using, for example, an accident scenario review analysis as described in more detail below. Failure prediction algorithms 72 may be used to predict a probability or a risk of failure of equipment 24 and/or instrumentation 26. For example, CF life prediction models, CFD models, FEA models, solid models, and/or 3-dimension to 2-dimension FEA mapping models, regression analysis models, and data mining models may be used to predict the risk of failure. Model updating algorithms 74 may update the aforementioned CF life prediction models, CFD models, FEA models, solid models, and/or 3-dimension to 2-dimension FEA mapping models, regression analysis models, and data mining models with the latest data and/or calculations. Action scheduling algorithms 76 may derive a schedule for performing actions, such as maintenance or operational actions, suitable for improving plant 10 resource use, such as the turbine system resource described below with respect to FIG. 2.

Figure 2:
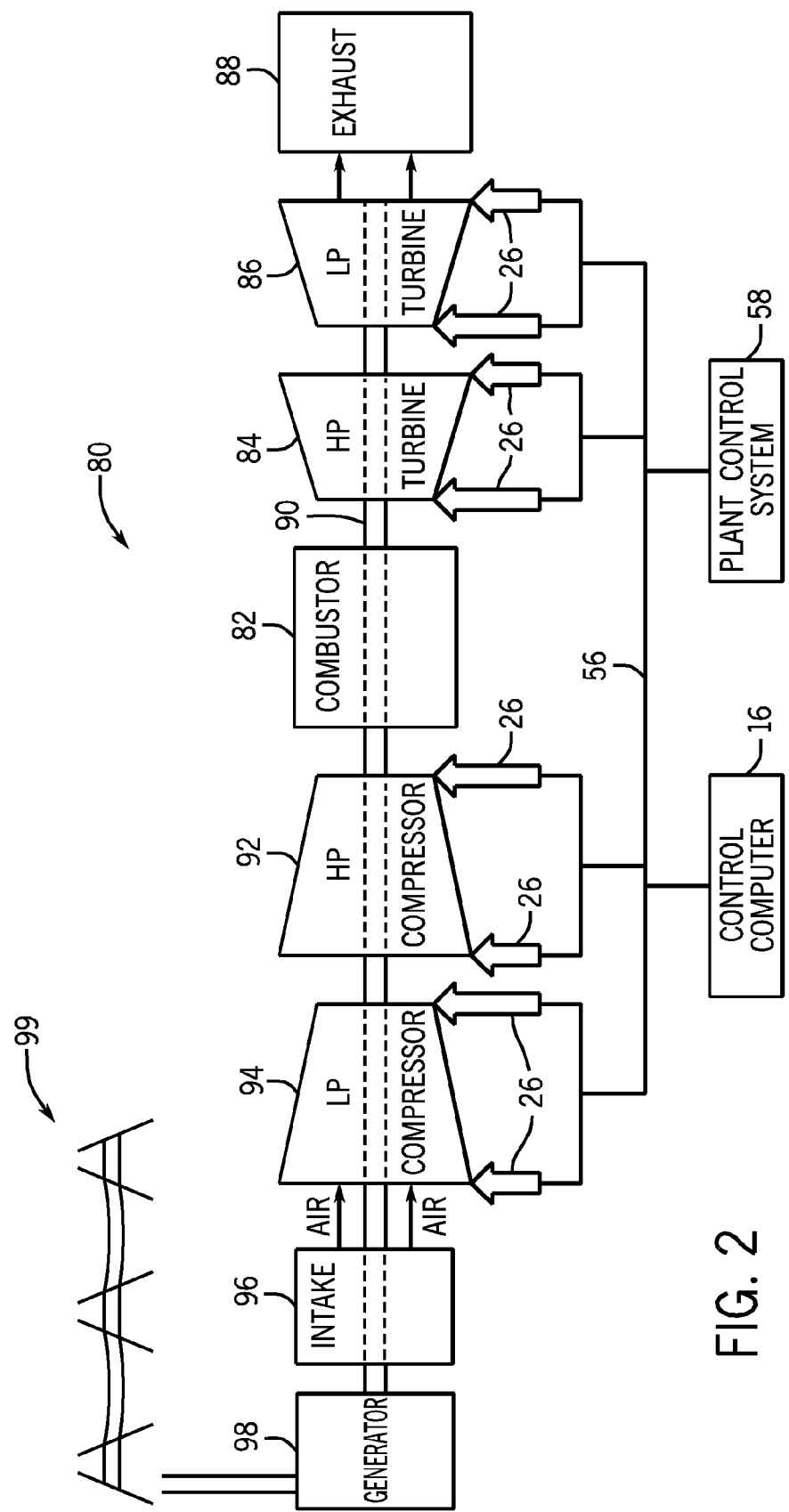
FIG. 2 is a schematic illustrating an embodiment of turbine system that may be used in the plant of FIG. 1.

FIG. 2 illustrates an embodiment of a turbine system 10 that may provide power in certain plants 10, such as power plants 10. As depicted, the turbine system 80 may include a combustor 82. The combustor 82 may receive fuel that has been mixed with air for combustion in a chamber within combustor 82. This combustion creates hot pressurized exhaust gases. The combustor 82 directs the exhaust gases through a high pressure (HP) turbine 84 and a low pressure (LP) turbine 86 toward an exhaust outlet 88. The HP turbine 84 may be part of a HP rotor. Similarly, the LP turbine 86 may be part of a LP rotor. As the exhaust gases pass through the HP turbine 84 and the LP turbine 86, the gases force turbine blades to rotate a drive shaft 90 along an axis of the turbine system 80. As illustrated, drive shaft 90 is connected to various components of the turbine system 80, including a HP compressor 92 and a LP compressor 94.

The drive shaft 90 may include one or more shafts that may be, for example, concentrically aligned. The drive shaft 90 may include a shaft connecting the HP turbine 84 to the HP compressor 92 to form a HP rotor. The HP compressor 92 may include blades coupled to the drive shaft 90. Thus, rotation of turbine blades in the HP turbine 84 causes the shaft connecting the HP turbine 84 to the HP compressor 92 to rotate blades within the HP compressor 92. This compresses air in the HP compressor 92. Similarly, the drive shaft 90 includes a shaft connecting the LP turbine 86 to the LP compressor 94 to form a LP rotor. The LP compressor 94 includes blades coupled to the drive shaft 90. Thus, rotation of turbine blades in the LP turbine 86 causes the shaft connecting the LP turbine 86 to the LP compressor 94 to rotate blades within the LP compressor 94. The rotation of blades in the HP compressor 92 and the LP compressor 94 compresses air that is received via an air intake 96. The compressed air is fed to the combustor 82 and mixed with fuel to allow for higher efficiency combustion. Thus, the turbine system 80 may include a dual concentric shafting arrangement, wherein LP turbine 86 is drivingly connected to LP compressor 94 by a first shaft in the drive shaft 90, while the HP turbine 84 is similarly drivingly connected to the HP compressor 92 by a second shaft in the drive shaft 90 internal and concentric to the first shaft. Shaft 90 may also be connected to an electrical generator 98. The generator 98 may be connected to an electrical distribution grid 99 suitable for distributing the electricity produced by the generator 98.

The turbine system 80 may also include a plurality of instrumentation 26, configured to monitor a plurality of engine parameters related to the operation and performance of the turbine system 80, as described herein. The instrumentation 26 may be positioned, for example, adjacent to the inlet and outlet portions of the HP turbine 84, the LP turbine 86, the HP compressor 92, and/or the LP compressor 94, respectively. The instrumentation 26 may measure, for example, environmental conditions, such as ambient temperature and ambient pressure, as well as a plurality of engine parameters related to the operation and performance of the turbine system 80, such as, exhaust gas temperature, rotor speed, engine temperature, engine pressure, gas temperature, engine fuel flow, vibration, clearance between rotating and stationary components, compressor discharge pressure, exhaust emissions/pollutants, and turbine exhaust pressure. Further, the instrumentation 26 may also measure actuator information such as valve position, and a geometry position of variable geometry components (e.g., air inlet). Measurements taken by the instrumentation 26 may be transmitted via the plant data highway 56 and received by the control computer 16 and the plant control system 58. Likewise, data from the control computer 16 and the plant control system 58 may be transmitted to the instrumentation 26. The transmitted measurements may then be processed to as part of the dynamic inputs 30 to optimize plant operations, for example, by using a logic 100 described in more detail below with respect to FIG. 3

Figure 3:
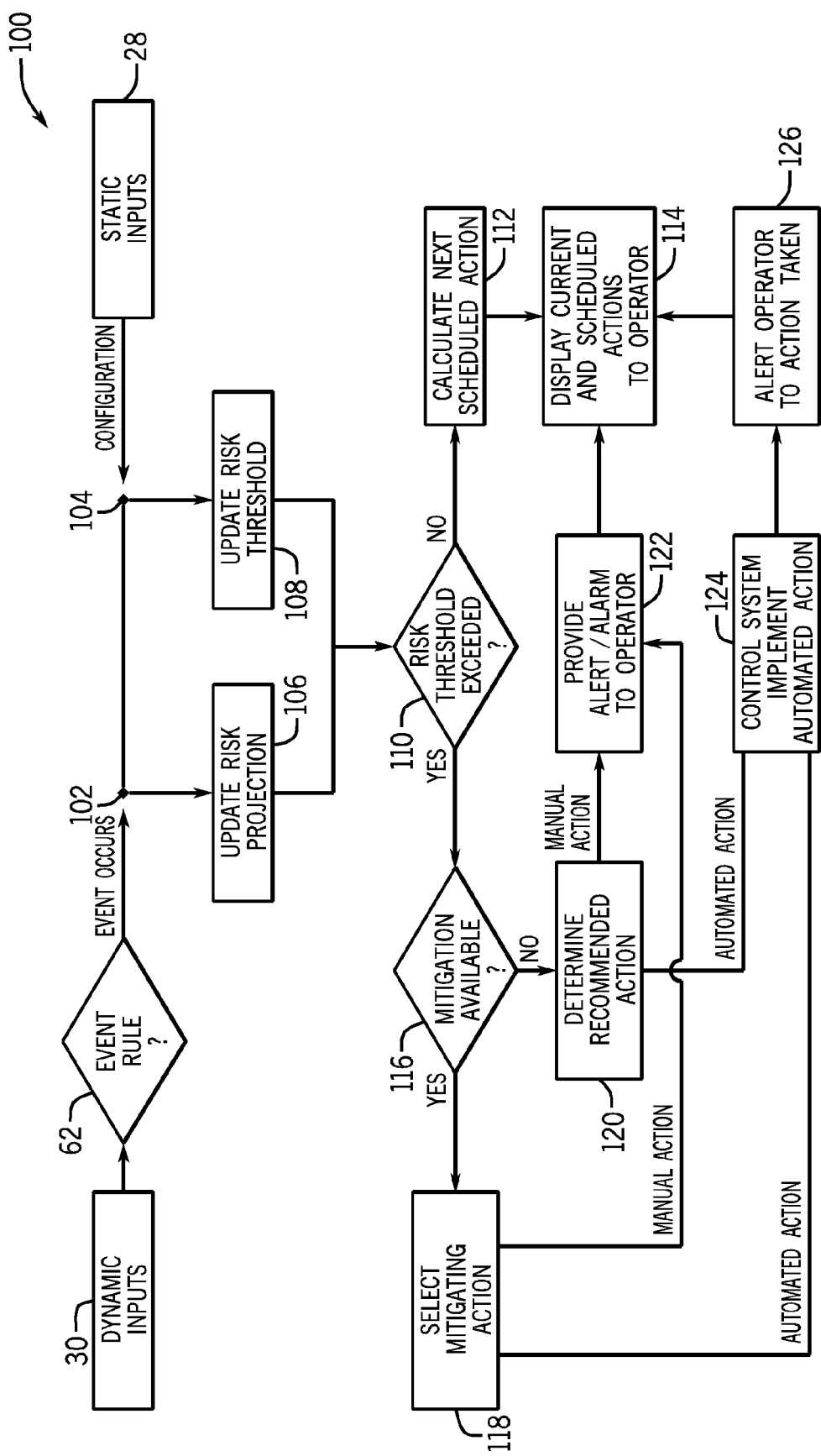
FIG. 3 is a flowchart illustrating an embodiment of a logic for optimizing plant operations.

FIG. 3 depicts and embodiment of the logic 100 that may be used by the control computer 16 (shown in FIG. 1), including the risk calculation engine 12 and the DSS 14, to optimize plant 10 operations. Indeed, the logic 100 as described in FIGS. 3-14 may be used by the control computer 16 to improve various aspects of plant 10 operations. For example, the logic 100 may be used to detect the occurrence one or more dynamic events 102 and static events 104, and to then use the static inputs 28 and the dynamic inputs 30 associated with the events 102 and 104 to derive a series of actions, including actions that may be implemented by the plant control system 58 (shown in FIGS. 1 and 2) to update the plant 10 operations. The logic 100 may be implemented as code or computer instructions stored in non-transient machine readable media executed, for example, by the control computer 16.

In the depicted embodiment, the dynamic inputs 30 may be constantly monitored by applying the one or more event rules 62 so as to determine the occurrence of the events 102. For example, the dynamic inputs 30 may be monitored every 1 millisecond, 10 milliseconds, 250 milliseconds, 1 second, 10 seconds, 1 hour and processed by applying the event rules 62. In one embodiment, the event rules 62 may take the general form of an "if . . . then . . . " rule with the "if" portion being defined as the rule antecedent and the "then" portion being defined as the rule consequent. For example, a rule, such as, "if valve1_data=no_data_transmitted then event_A=valve_1_failure," may be used to determine that a valve failure event or a transmission failure event may have occurred. In one embodiment, an expert system or an inference engine may be used to evaluate the dynamic inputs 30 by using the event rules 62. Indeed, the expert system may continually process the dynamic data 30 by applying the event rules 62 so as to automatically derive a list of one or more events 102. In certain embodiments, the event rules 62 may include fuzzy rules using a fuzzy logic system suitable for processing fuzzy values, such as "very_hot", "low_flow," "good_clearance," and the like. The fuzzy logic system may then derive the events 102 based on the use of the fuzzy logic rules.

A non-exhaustive list of events 102 that may be derived include equipment operation events (e.g., equipment is turned on, equipment is performing as desired), equipment operation relative to benchmarked operation (e.g., determination of equipment health) events, instrumentation operations at full span events, instrumentation operations at a specified span events, instrumentation at known reference calibration events, change in instrument health events (e.g., loss of redundancy, partial failure, full failure), trips or unexpected shutdown of equipment (e.g., turbine system trips), trips or unexpected shutdown of the plant 100, equipment operating hour events (e.g., over 100 hours, over 1000 hours, over 10,000 hours), instrumentation operating hour events, pressure events (e.g., low pressure, normal pressure, high pressure), temperature events (e.g., low temperature, normal temperature, high temperature), transient operations events, manual operator events (e.g., starting equipment, shutdown of equipment, responding to alerts), external system events (e.g., unexpected shutdown of another plant, changes in the weather, rise or fall of market demand for power), system failure events, equipment maintenance events (e.g., equipment replacement, equipment repair, type of maintenance performed, length of maintenance performed), events related to changes in external interdependent systems, events related to changes in acceptable risk levels, events related to the identification of new failure modes or models, events resulting from automated system tests (e.g., valve leak tests), events related to process conditions indicating failure risks (e.g., fluctuation in vat levels), events based on output of monitoring systems (e.g., turbine monitoring systems), events related to changes in trends of equipment (e.g., trending towards low temperature, trending towards high pressure), and the like. It is also to be understood that static inputs 28 may also result in the derivation of the static events 104, such as changes related to the static inputs (e.g., updated designs, updated equipment procedures, updated plant processes).

The events 102 and/or 104 may then be used to update a risk projection (block 106) and to update a risk threshold (block 108). The updated risk projection and threshold may include risks associated with the events 102 and/or 104. That is, if the event 102 includes a determination of equipment health event, the risks may include risks associated with the equipment health, such as risks of equipment failure, risks of the equipment undergoing unexpected maintenance, risks of the equipment necessitating a spare part, and the like. Likewise, if the event 102 includes weather events, then the risks may include risk of plant outages due to weather conditions, risks of higher (or lower) demand for electric power, risks of fuel delivery slowdown or stoppages due to weather, and the like. Indeed, each event 102 and 104 may include one or more associated risks.

In one embodiment, updating the risk projection (block 106) may include processing the static inputs 28 and the dynamic inputs 30 related to the events 102 and 104 so as to derive a new or updated risk projection. For example, if one or more of the events 102 relates to the health of a turbine system, then the failure mode analysis and risk review data 38 may include using the physics-based models and statistical models related to the turbine system 80 (shown in FIG. 2) to update the risk of operating the turbine system 80. In one example, an accident scenario review (ASR) process is used to arrive at the updated risk projection. In ASR, a probabilistic event model may be built and used in risk analysis. A software tool, such as RENO™, available from Reliasoft Corporation of Tucson, Ariz., may be used to build a multinode graph or flowchart modeling of an ASR. A root of the flowchart or graph may represent an accident scenario, such as a detached blade in the LP turbine 86, and the flowchart may derive risks of the detached blade, that may lead to failures in other components of the turbine system 80. The "leaves" or low-level nodes in the flowchart or graph may then carry a risk score of failure of a certain component.

Accordingly, the risk scores of components of the plant 10 may be derived, for example by using the static inputs 28 and dynamic inputs 30 as inputs into statistical and/or physics-based models, and the ASR analysis may be performed so as to arrive at a risk projection for failure of certain systems or components in the plant 10. For example, LCF life prediction models, CFD models, FEA models, solid models, and/or 3-dimension to 2-dimension FEA mapping models, regression analysis models, and data mining models may be used to derive the risk scores used as inputs into the ASR process. Other risk modeling techniques, such as fault tree analysis (FTA), may also be used to update or derive the risk projection (block 106). FTA uses failure events and a system tree diagram to calculate a probability of failure in the modeled system or component. Indeed, updating a risk projection (block 106) may include updating a risk projection for the plant 10 as well as for any component of the plant 10, such as the turbine system 80.

The updating of the risk threshold (block 108) may include raising or lowering the risk threshold based on the dynamic data 30 and/or the static data 28 associated with the events 102 and 104. For example, if the events 102 include an event such as a high market demand for electric power, then the risk threshold of operating a power plant may be raised within a certain range so as to increase plant 10 revenue while maintaining adequate safety and operational effectiveness. In another example, if the event 102 includes an event, such a turbine system 80 trip event, then the risk threshold of restarting the turbine system 80 may be updated. By updating the risk threshold in response to changes in static or dynamic inputs 28 and 30, the logic 100 may enable the use of a more focused risk threshold suitable for incorporating knowledge of real-world situational conditions (e.g., weather, markets, operating equipment condition). Indeed, the risk threshold may be dynamically recalculated continuously (e.g., every 1 sec, 10 sec., 1 hour, 24 hours) to incorporate recent events and changes in the inputs 28 and/or 30.

If the logic 100 determines that the updated risk projection does not exceed the updated risk threshold (decision 110), then the logic 100 may calculate the next schedule action (block 112) and display any current and/or scheduled actions to the operator (block 114). The next scheduled action may include a maintenance action (i.e., next scheduled maintenance action), an operational action (i.e., next scheduled operation), and/or a process action (i.e., next scheduled process). For example, a maintenance schedule may include multiple actions such as inspecting plant equipment, replacing certain components periodically, performing equipment proof tests, and so forth Likewise, an operational schedule may include time-based actions useful in, for example, starting up plant operations and/or equipment. For example, a turbine startup may include a schedule of operational actions based on delivering fuel, igniting the fuel, and controlling the delivery of fuel and air so as to reach a certain turbine speed. Similarly, a process schedule may include a process flowchart detailing a schedule of steps to follow in performing the process. Accordingly, the next scheduled action may be calculated (block 112). The display of the current and/or scheduled action (block 114) may thus include presenting a list, such as a time-based list of actions along with data related to the action, such as action duration, action cost, estimated time to completion, estimated resources used, and so forth. By calculating (block 112) and displaying the next scheduled action (block 114), the logic 100 may iteratively process the inputs 28 and 30 and update the risk projection (block 106) and the risk threshold (block 108).

If the logic 100 determines that the updated risk projection exceeds the updated risk threshold (decision 110), then the logic 100 may determine if a mitigation action is available (decision 116). For example, a list of mitigating actions based on the type of risk currently being processed by the logic 100 may be used by the mitigation action algorithms 66 (shown in FIG. 1) to determine if a mitigation action is available (decision 116). For example, risks of equipment failure may be mitigated by replacing certain parts, repairing the part, replacing equipment 24, overhauling equipment 24, replacing instrumentation 26, repairing instrumentation 26, and so on. Risks associated with regulatory non-compliance may be mitigated by adding equipment to comply with regulations, and/or creating certain processes based on regulatory demands (e.g., pollution monitoring processes, carbon capture sequestration processes, emissions trading strategies). If it is determined that one or more mitigation actions are available (decision 116), then a mitigation action or actions may be selected (block 118). The mitigation action(s) may be selected based on factors such as costs (e.g., cost of new equipment, cost of equipment repair, cost of implementing new processes), probability of mitigation success, impact on interdependent systems, impact on regulations, code, and standards, impact on personnel and equipment, and so forth.

If no mitigation action is available (decision 116), algorithms such as the recommended action algorithms (block 68) may be used to determine a recommended action (block 120). The recommended action may be determined (block 120) by analyzing the current situational status and inputs 28 and 30 so as to derive an action useful in reducing risk. For example, if the risk is associated with possible weather disruptions (and/or natural disasters such as earthquakes, tsunamis, hurricanes, tornadoes, and the like), to power production operations, then the recommended action may include preparing personnel and systems for inclement weather (and/or natural disasters) and for power re-routing through the available portions of the power grid. Likewise, the recommended action may include raising the cost of power production in the futures market so as better prepare for any adverse effects associated with the weather disruption and/or natural disasters.

Selecting the mitigation action (block 118) and determining the recommended action (block 120) may include manual actions and automated actions. The manual actions may be communicated to an operator, for example, through alerts and alarms (block 122). The provided alerts and alarms (block 122) may include textual information and multimedia (e.g., images, video, 3D views, audio) descriptive of the mitigation action or recommended action. For example, the alerts and alarms may include audio tones suitable for alerting a user and flowcharts, as well as CAD diagrams, textual descriptions, videos, images, and so forth, of information useful in performing the mitigation action and the recommended action. The current and/or schedule actions may then be displayed (block 114), as described above.

Selecting the mitigation action (block 118) and determining the recommended action (block 120) may also include automated actions. For example, actions suitable for implementation by the plant control system 58 (shown in FIG. 1) may be derived. Accordingly, the automated actions may be communicated to the plant control system 58 and implemented in the plant 10 (block 106). The logic 100 may then alert the operator (block 122) of the automated action that was taken based on the mitigation action or the recommended action, and display the current and/or schedule actions (block 114). In this way, the logic 100 may continuously process the data 28 and 30 so as to derive any risks associated with the data 28 and 30, and respond by issuing manual and/or automated actions suitable for minimizing or eliminating the derived risks. It is to be understood that the logic 100 may be applied to a variety of processes and equipment. Indeed, the logic 100 may be used to derive decisions for improving the testing of equipment protection systems, the testing of pressure relief valve operations, the calibration of instrumentation, the replacement of instrumentation, the performance of equipment inspection, the performance of equipment maintenance, the risk of equipment failure during a specified time, the performance of equipment operations to maintain desired reliability levels, the timing of testing, operational, and calibration procedures to maintain desired reliability levels, the identification of beneficial system upgrades, and the prioritization of values (e.g., prioritization of the impact of certain plant 100 actions), as described in more detail below with respect to FIGS. 4-14. Because the depicted FIGS. 4-14 include like elements found in FIG. 3, these elements are denoted using like reference numbers.

Figure 4:
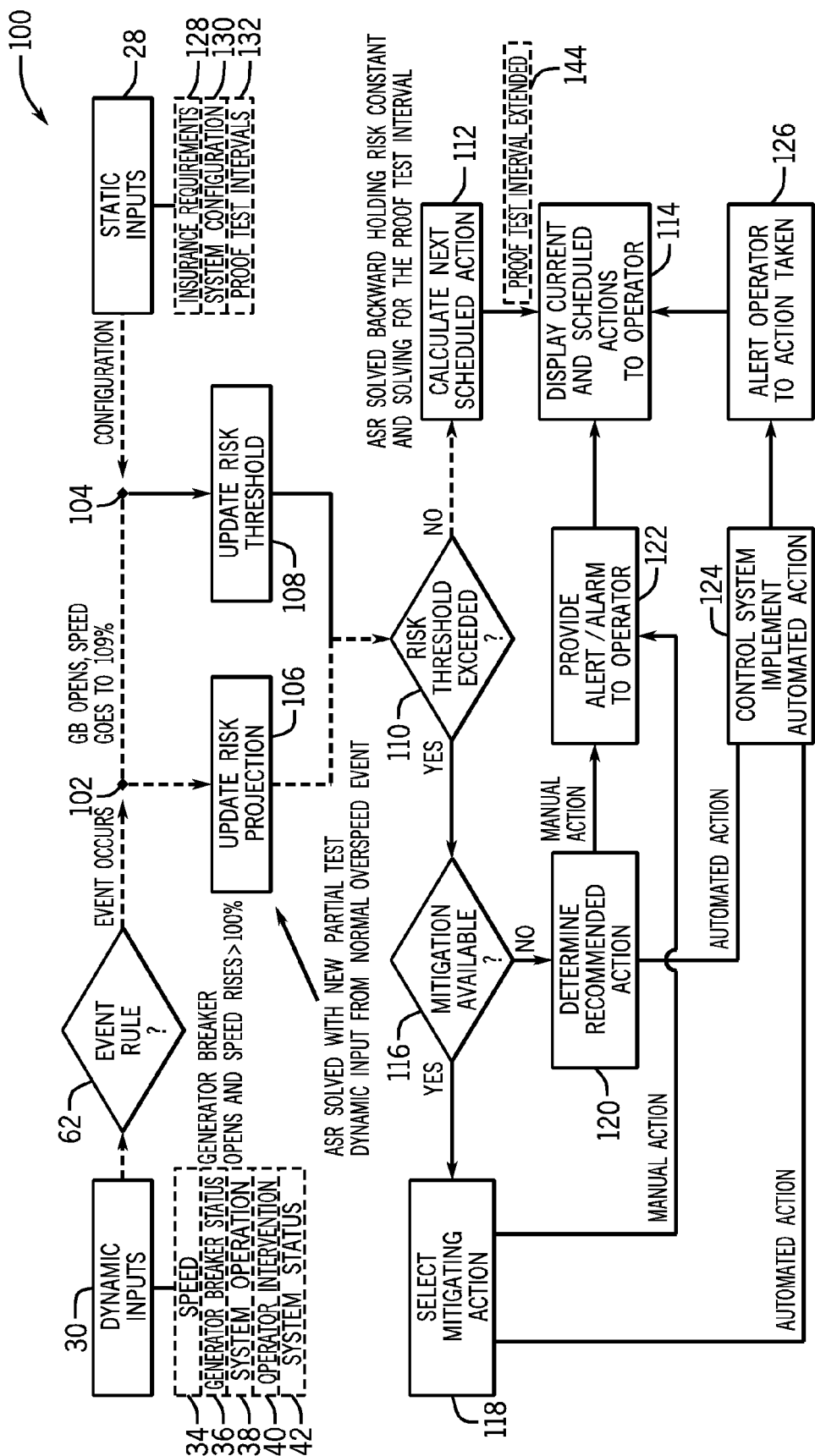
FIG. 4 is a flowchart illustrating an embodiment of the logic of FIG. 3 as applied to the testing of systems.

FIG. 4 illustrates an embodiment of the logic 100 as applied to optimizing the testing of equipment protection systems, such as an overspeed protection system. In certain types of equipment, such as power generation systems, the equipment may undergo periodic proof tests useable in determining the suitability of the equipment for continuing to operate in the plant 10. That is, the proof tests may use the equipment in certain ways, such as by disconnecting the power generation system from the electrical grid, to insure that the system responds appropriately. For example, during a full load rejection, the power distribution grid 99 may fail to accept power produced by the turbine system 80. Certain systems, such as the overspeed protection system, may then react by reducing turbine load quickly while simultaneously limiting over speed. The turbine system 80 may then be brought to a condition suitable for optimizing synchronization of the turbine system 80 with the power grid 99 once the power grid begins to accept power.

The testing of equipment protection systems may be scheduled, for example, to occur once every year, once every month, once every week. Performing the test may impact the plant 10 due to the offlining of the turbine system 80 from the power grid 99, with a corresponding reduction in the power produced by the plant 10. The logic 100 may be used to enable the "crediting" of certain events, such as a full load rejection event, that may have occurred during normal operations, to be used in lieu of testing. That is, the unexpected event may be used in lieu of the scheduled test. For example, a full load rejection may occur a few weeks prior to the scheduled full load rejection test. The behavior of the equipment during the full load rejection may then be observed, and if the system behaves appropriately, then system may be deemed to have passed the full load rejection test. The scheduled full load rejection test may then be re-scheduled. In this way, historical events may be "credited" and plant 10 tests may be moved to the future as needed. Accordingly, plant 10 resources may be more efficiently utilized.

As depicted, the static inputs 28 may include insurance requirements 128 (e.g., perform full load rejection test once per year), system configuration 130, and proof test intervals or schedules 132. The dynamic inputs 30 may include turbine speed inputs 134, a status of the generator breaker 136 (e.g., open or closed), turbine system operation information 138 (e.g., system is ramping up, system is ramping down), an operation intervention information 140 (e.g., operator is manually setting valve positions), and overall system status 142 (e.g., power produced, weather conditions). The event rules 62 may derive that a full load rejection event 102 is occurring based on the generator breaker tripping and an increase in turbine speed measured at over 100% of the desired speed (e.g., current speed may be measured at 109% of desired speed).

The logic 100 may then use the inputs 28 and 30 to update a risk projection (block 106) of continuing operations with the overspeed protection system in its current status, and related components (e.g., bypass valves, piping, controller). For example, the ASR process or FTA may be used to update the risk projection based on the dynamic inputs 30. If the overspeed protection system successfully managed a full load rejection event 102, the updated risk is likely to not exceed a risk threshold (decision 110) of continuing operations with the current equipment (e.g., turbine system 80). That is, the overspeed protection system performed as desired during the unexpected full load rejection, and therefore, would have passed a scheduled full load rejection test.

Accordingly, the calculated next scheduled action (block 112) may include calculating a new extended proof test interval 144, and re-scheduling any existing proof tests. The new interval may be calculated, for example, by using the ASR process "backwards." That is, the risks usually derived from the ASR process may instead be used as inputs to the ASR process, the ASR flowchart may be navigated in reverse to arrive at a new proof test interval. Other techniques, such as FTA, may also be used to derive the new proof test interval. The new proof test interval, along with the data and calculations used to derive the new interval, may be displayed to the operator (block 114). In this way, plant occurrences such as plant trips, overspeed events, operator shutdown events, and the like, may be used to provide "credit" for formal testing as well as used in determining a revised testing schedule. It is to be noted that such testing "credit" may be applied to the various types of plant 10 components, including individual instrumentation 26, individual equipment 24, equipment subsystems (e.g., compressor 92 and 94, turbine 84 and 86, generator 98) and complex systems (e.g., turbine system 80, plant 10).

Figure 5:
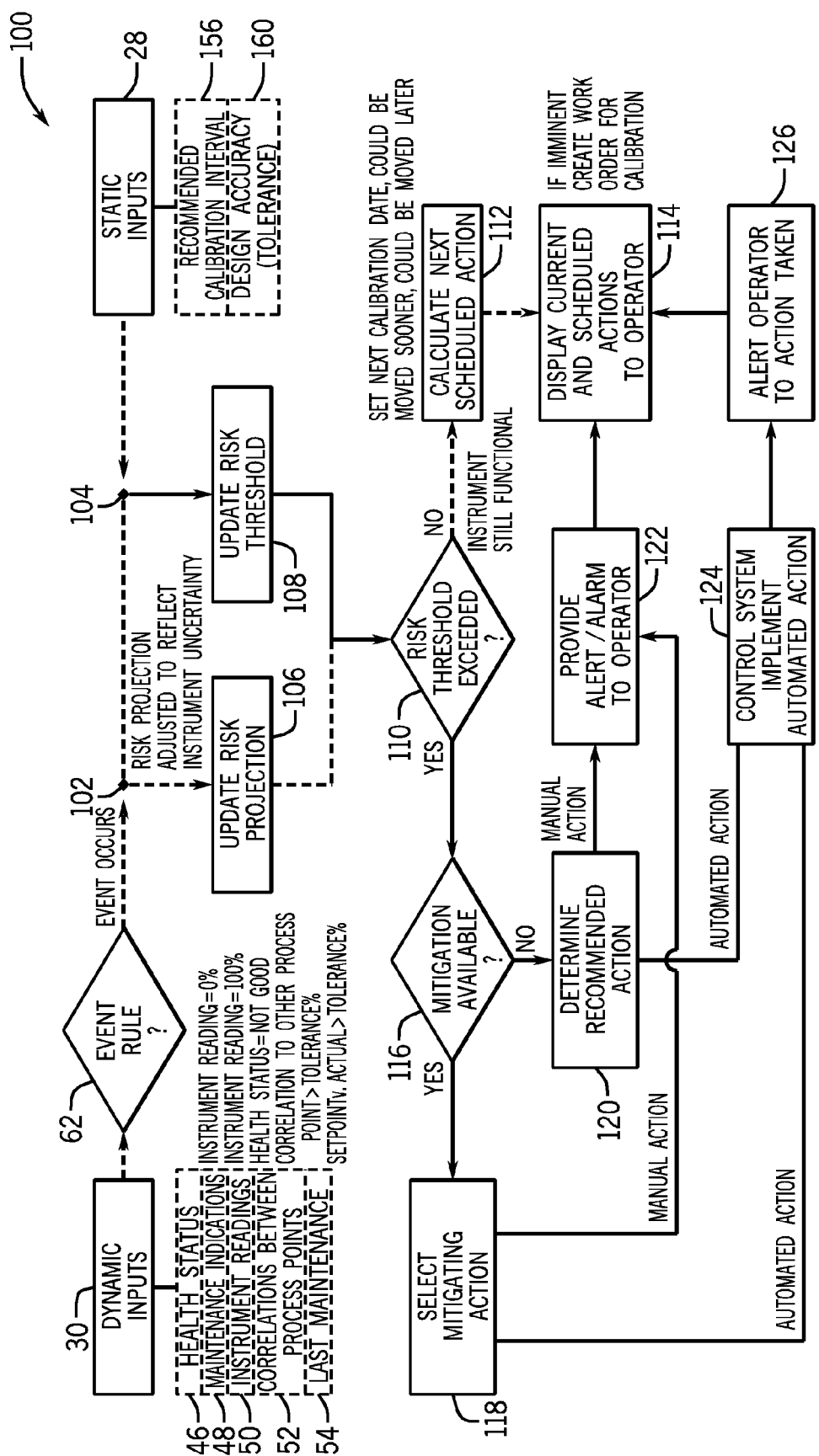
FIG. 5 is a flowchart illustrating an embodiment of the logic of FIG. 3 as applied to calibrating instrumentation.

FIG. 5 is illustrative of an embodiment of the logic 100 as applied to more efficiently calibrating the instrumentation 26. In the depicted embodiment, a variety of the dynamic inputs 30 may be collected during plant operations and used in conjunction with the static inputs 28 to derive actions affecting instrument 26 recalibration, instrument 26 maintenance, and/or instrument 26 replacement. For example, the dynamic inputs 30 may include a health status 146 of the instrument 26. The health status 146 may be derived through visual inspection or may be automatically reported by the instrument 26. Indeed, the instrument 26 may include a variety of protocols, such as Hart, Foundation Fieldbus, Profibus, and the like, capable of communicating the health status with the control computer 16 and the plant control system 58. The health status 146 may be a binary status (i.e., healthy or unhealthy), or a range of health statuses 146 (e.g., approximately 100% healthy to 0% healthy). The health status 146 may also be a multi-bit health status 146, where each bit may correspond to different health statuses 146. For example, a valve instrument may be capable of reporting more than one measurement (e.g., pressure, flow rate, temperature), and the health statuses 146 of each of the provided measurements.

Maintenance indications 148 may also be included in the dynamic inputs 30. For example, maintenance logs for the instrumentation 26 and the related equipment 24 may be used, including paper and electronic logs, that detail maintenance performed, type of maintenance, issues, and the like. Instrument readings 150 may also be used, including readings from other instruments 26. For example, redundant instrumentation should approximately transmit the same readings, and readings outside of a certain range may be marked as suspect Likewise, a correlation between two or more process points, each process point having one or more instrumentation 26, may be used to derive instrumentation performance. For example, temperature instrumentation 26 may be located before, during, and after an operation resulting in thermal gains (or losses), such as temperature sensors placed before, inside and after the combustor 82, a chemical vat, a chiller, and so forth. Accordingly, the measurements transmitted from the instrumentation 26 may be correlated to expected measurements based on the location of the instrumentation 26. Last maintenance 154 inputs may also be used, such as dates of the last maintenance, type of maintenance performed, reason for maintenance (e.g., scheduled maintenance, unscheduled maintenance), and so forth.

The logic 100 may use the event rules 62 to derive, for example, a health measurement event 102 for the instrumentation 26. The event rules 62 may include rules such as "if instrument_readings=0% then instrument=failed," "if instrument_readings=100% then instrument=healthy," "if instrument_readings=unreliably then health_status=not_good," and the like, to derive the events 102. The events 102 may include a health of the instrumentation 26, measured as a binary measurement (i.e., healthy vs. unhealthy), a range of health (e.g., 0% to 100%), and/or values such as excellent_health, good_health, nominal_health, needs_repair. Static inputs 28 may be used to aid in deriving the events 102 by providing, for example for a recommended calibration interval 156, detailing a desired calibration schedule. Static inputs 28 may also include a design accuracy or tolerance 158. The design accuracy or tolerance 158 may include a desired range of values for measurements derived by the instrumentation, such as approximately ±0.5%, 1%, 5%, 10% error.

The logic 100 may then update the risk projection (block 106) of continuing operations based on the derived instrumentation 26 health. Should the risk not exceed the risk threshold (decision 110) of continuing operations, then the next scheduled action may be calculated (block 112). The next scheduled action may include a re-scheduling of the instrumentation calibration date (e.g., move date forward or move date backwards), or the creation of a work order for replacement or repair of the instrumentation 26. Indeed, by continuously monitoring dynamic inputs 30 and static inputs 28, the logic 100 may optimize the calibration, repair, and maintenance of the instrumentation 26. The next schedule action may then be displayed (block 114) to the operator. By continuously deriving instrumentation 26 health, updating risks related to the derived health, and deriving appropriate actions, the overall plant 10 operations and maintenance may be improved. It is to be noted that the logic 100 may also provide for mitigation actions, such as using backup instrumentation, as well as recommended actions, such as replacing the instrumentation, should the risk threshold not be exceeded (decision 110). Additionally, the logic 100 may be used to improve plant 10 efficiency through the monitoring of upcoming equipment operations or future usage, as described in more detail below with respect to FIG. 6.

Figure 6:
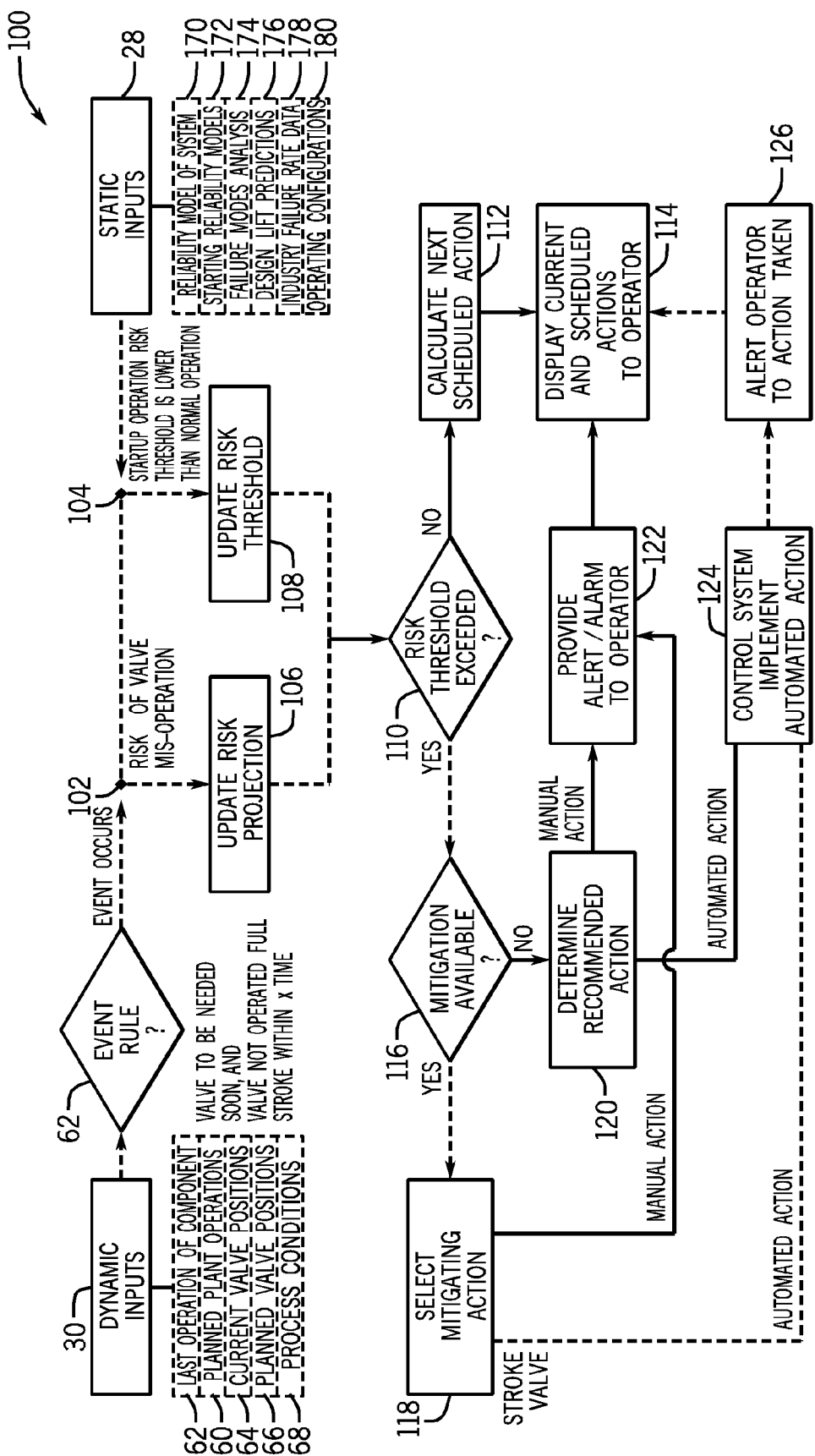
FIG. 6 is a flowchart illustrating an embodiment of the logic of FIG. 3 as applied to monitoring upcoming equipment usage.

FIG. 6 depicts an embodiment of the logic 100 as applied to improving the efficiency of equipment operations by monitoring upcoming equipment usage, deriving current equipment condition, and responding with appropriate actions. In this way, the logic 100 may enable an automated, dynamic pre-operation check of the equipment. For example, the dynamic inputs 30 may include planned plant operations data 160, such as data detailing an upcoming startup (or shutdown) of the turbine system 80. The startup (or shutdown) operations may require the use of equipment not regularly in use during standard running operations, or may require the use of equipment in a certain way that is not regularly used in standard running operations. For example, the turbine system 10 may use a primary and a backup ignition exciter during startup operations but not during standard running operations. Similarly, certain valves may now be required that were previously not being used. The logic 100 may pre-test the equipment before the actual usage of the equipment, so as to derive a risk of using the equipment. For example, valves may be stroked (e.g., fully or partially opened and fully or partially closed) so as to gauge their operational effectiveness.

The logic 100 may use dynamic inputs 30, such as the last operation of a component 162, current component data 164 (e.g., current valve positions, component health), planned component usage 166 (e.g., planned valve positions, component usage times), and/or process conditions 168 (e.g., process temperatures, pressures, flow rates, clearances, type of fuel used), to derive the events 102. The events 102 may include events, such as a need for certain valves to be operated during startup operations, and that certain valves have not operated at full stroke within a certain time window.

The logic 100 may also use static inputs 28, such as reliability models of the system 170, planned operations reliability models 172 (e.g., turbine startup reliability models, shutdown reliability models, transients reliability models, regular operations reliability models), failure mode analysis models 174, design life predictions 176, industry failure rate data 178, and/or operating conditions 180, to update the risk projection (block 106) of the equipment 24 and/or instrumentation 26 not performing as desired. For example, the reliability model of the system 170 may be used to determine a baseline reliability. The planned operations reliability models 172 (e.g., turbine start reliability models) may be used to update the baseline reliability based on, for example, additional information such as the statistical likelihood of component failures during startup operations, shutdown operations, trip operations, and so forth. Failure mode analysis 174 may be used to derive what would be the consequences of certain component failures, such as valves, instrumentation, pipes, fuel delivery systems, and so forth. Design life predictions 176 may be used to derive a current lifespan for the various components, based on predictive lifespan and actual component usage. Industry failure rate data 178 may be used to derive statistical models for component failure based on data from industry databases, which may include manufacturer databases and other historical failure rate databases. Operating configurations 180 may be used to determine the component configurations or layout, and traditional usage.

The logic 100 may use all of the inputs 28 and 30 to update the risk projection (block 106) of the risks associated with the upcoming planned operations as described above, as well as to update the associated risk thresholds (block 108). For example, the updated risk threshold may be lowered or raised based on the upcoming planned plant 10 operation (e.g., turbine startup) and the static inputs 28. In some circumstances, the risk threshold (decision 110) may be exceeded. The logic 100 may then determine if any mitigation actions are available (decision 116). If one or more mitigation actions are available, then the logic 100 may select the one or more mitigation actions (block 118) suitable for reducing the risk of the upcoming operations. For example, if certain valves are going to be used in the upcoming operations, and the valves have not been used in a certain period of time (such as over 24 hours, over 3 days, over a week, over a month), then the selected mitigation actions may include an automated action, such as stroking or partially stroking a valve (i.e., moving a valve in the open or closed directions) through the control system (block 124). In this way, the valve may be automatically "pre-checked" as suitable for the upcoming operations. Likewise, other mitigation actions may include automatically or manually actuating equipment 24 such as variable geometry inlets, milling machines, chemical processing equipment, backup systems, turbine system 10 components, and the like, to insure operational readiness. Indeed, the logic 100 may be applied to a variety of plant equipment 24 and instrumentation 26 to pre-test systems before the systems enter operations.

Figure 7:
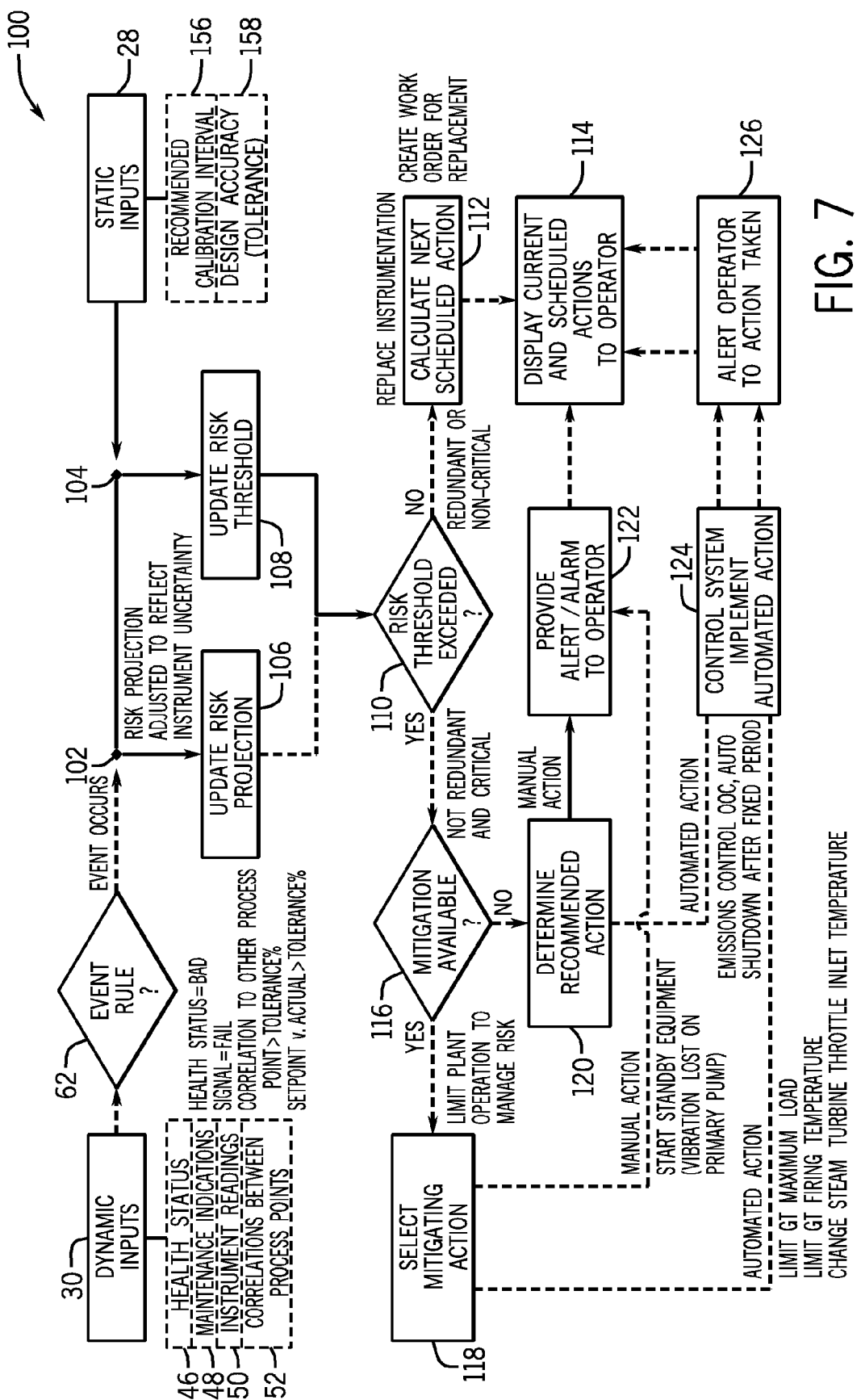
FIG. 7 is a flowchart illustrating an embodiment of the logic of FIG. 3 as applied to optimizing operations with unreliable instrumentation.

FIG. 7 is illustrative of an embodiment of the logic 100 as applied to more efficiently operating the plant 10 (shown in FIG. 1) even in the event that some of the instrumentation 26 becomes unreliable or otherwise inoperable. For example, the unexpected loss of one or more of the instruments 26 may not necessarily require the immediate replacement of the failed instruments 26, and plant 10 operations may be allowed to continue under certain circumstances. In this way, more optimal usage of resources and production of the plant 10 may be realized, even in situations where some instrumentation 26 was to fail.

In the depicted embodiment, the dynamic inputs 30 may include the health status 146 of the instrumentation 26, the maintenance indications 148, the instrument readings 150, and the correlation between two or more process points 152, each process point having one or more instrumentation 26, as described above with respect to FIG. 5. The static inputs 28 may also include the recommended calibration interval 156 as well as the design accuracy (tolerance) 158, also as described above with respect to FIG. 5. The logic 100 may use the event rules 62 to derive that certain instrument failure events 102 have occurred, such as "health_status=bad," "signal=fail," or that the instrument is outside desired tolerances. Accordingly, the logic 100 may update the risk projection of using the instrument 26 (block 106) and may also update any risk threshold associated with the instrument 26 (block 108). For certain instruments 26, for example, instruments 26 that have redundant instruments and instruments 26 that may not be critical in plant operations (e.g., exhaust 88 temperature sensor), then the risk threshold (decision 110) of not using the instrument may not be exceeded. The logic 100 may then simply create a work order for replacement, and schedule the work order as part of a normal maintenance schedule, as the next scheduled action (block 112). The work order may then be displayed to the operator (block 114).

For instruments 26 that may be more critical to plant operations, the risk threshold of not using the instrument 26 may be exceeded (decision 110). The logic 100 may then decide on any possible mitigation courses of action (decision 116). In certain circumstances, it may be possible to mitigate the risk to plant operations by selecting certain mitigation actions (block 118). For example, if the instrument 26 that has failed is measuring turbine temperatures (e.g., HP turbine 84 or LP turbine 86), then the turbine may be allowed to operate, albeit, at reduced limits. For example, the turbine may be allowed to operate at 95%, 90%, 80%, 50% of maximum load. Likewise, the firing temperature for the turbine may be similarly limited. In a steam turbine example, the turbine may include a temperatures sensor at a boiler outlet and a temperature sensor at a steam turbine inlet. Should the inlet sensor fail, the steam turbine may be allowed to continue operations at reduced temperatures as measured by the outlet sensor. Likewise, should the outlet sensor fail, the boiler may be allowed to continue to provide steam, albeit at lower temperatures, as measured by the inlet sensor. Indeed, automated actions may be directed to the control system so as to implement the more limited operational mode (block 124). Manual mitigation actions may also be implemented. For example, should a critical vibration sensor fail on a first pump, but a second standby pump is available, then the logic 100 may manually direct the operator to start the second standby pump. In this way, the failure of instrumentation may be recognized and appropriate mitigation action may be taken so as to continue plant 100 operations.

If it is determined that no mitigation action is available (decision 116), then certain recommended actions may be taken to optimize plant operation, such as regulatory compliance operations. For example, if the instrumentation 26 that may have become inoperable includes instrumentation 26 required for emission monitoring, then the recommended action may include a recommendation for immediate replacement of the failed instrumentation 26 and an automated action to shut down the plant if the replacement is not completed before the end of a certain time period (e.g., 15 minutes, 1 hour, 4 hours, 1 day). In this way, the logic 100 may detect that critical instrumentation has become unreliable, and initiate recommended actions suitable for continuing plant 10 operations. Additionally, the logic 100 may optimize plant operations across multiple plants 10, as described in more detail below with respect to FIG. 8.

Figure 8:
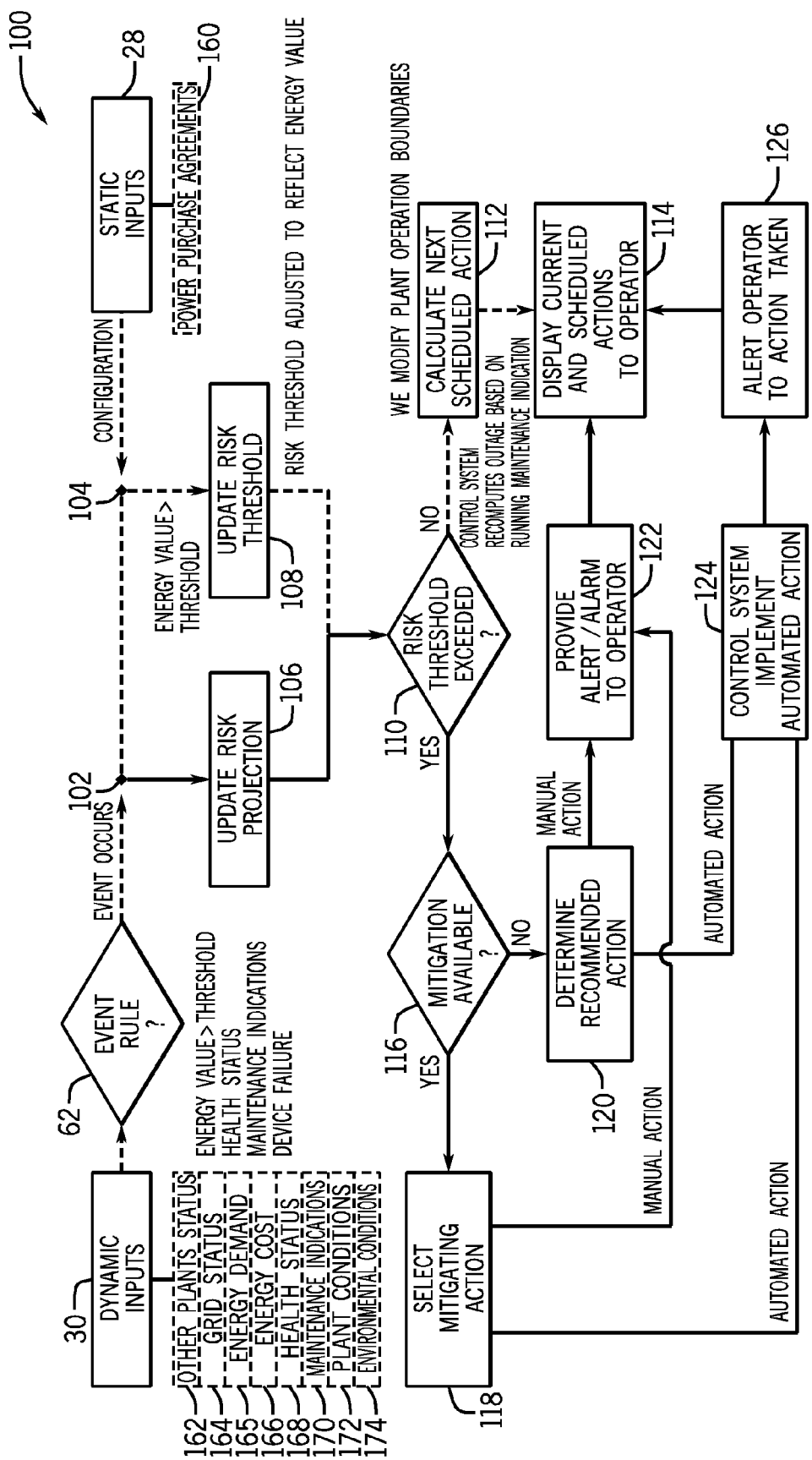
FIG. 8 is a flowchart illustrating an embodiment of the logic of FIG. 3 as applied to managing multiple plants.

FIG. 8 depicts an embodiment of the logic 100 as applied to managing multiple plants 10, such as multiple power generation plants 10. In the depicted embodiment, the static inputs 28 include power purchase agreements data 160. The power purchase agreements data 160 may detail an amount of power to be delivered, for example, to the grid 99, over a certain time period. A provider of power may use one or more power plants 10 to deliver the power to the grid 99, in accordance with the power purchase agreements 160. The logic 100 may advantageously monitor the one or more power plants 10, as well as energy markets, environmental conditions, and the like, so as to optimize the delivery of power while respecting the power purchase agreements 160.

In the depicted embodiment, the dynamic inputs 30 may include other plant statuses 162 (e.g., operational status of other plants, power production capacity for other plants), a grid status 164 (e.g., current power distributed by the grid, forecasted power, portions of the grid that may be experiencing outages, routing diagrams for grid power), an energy demand 165 (e.g., current demand, forecasted demand), an energy cost 166 (e.g., fuel costs, electric power production costs), a health status 168 for all power plants 10, maintenance indications 170 (e.g., upcoming equipment 24 and instrumentation 26 maintenance, current equipment 24 and instrumentation 26 maintenance, current work orders), plant conditions 172 (e.g., status of plant equipment, personnel on leave, backup power production capacity), and environmental conditions 174 (e.g., current weather, forecasted weather).

The logic may update the risk threshold (block 108), for example, to reflect an economic value for current energy or power. More specifically, a higher value for energy may result in a raising of the risk threshold, while a lower value for energy may result in a lowering of the risk threshold. By adjusting the risk threshold based on energy valuation, the logic 100 may enable the use of energy valuation in deriving operational decisions in the plant(s) 10. Indeed, energy markets as well as weather may be used to make decisions suitable for increasing the production efficiency and profit of multiple power plants 10.

In the illustrated example, the logic 100 may be monitoring the dynamic data 30 to derive the energy value, for example, by observing energy demand and supply in an energy market (e.g., electrical power market, oil market, gas market, coal market, futures market). An event rule 62, such as "if energy_value>threshold" may be used to derive the events 102 and thus initiate an analysis of the risk projections related to the plants 10. The risk projections may include risks associated with downtime due to scheduled maintenance, weather events, equipment 24 and instrumentation 26 failure risks derived by using statistical and/or physical models, economic risks associated with rising demand, and the like. The risk threshold may also be updated (block 108) to incorporate a revised risk threshold based on an analysis of the power purchase agreement 160, associated static inputs 28, and the dynamic inputs 30. For example, if the energy value is high (e.g., 10%, 20%, 50% over customary energy values), then the risk threshold may be raised. If the energy value is low (e.g., 10%, 20%, 50% below customary energy values), then the risk threshold may be lowered Likewise, if the power purchase agreement 160 includes penalties for not providing sufficient power, then the risk threshold may be raised correlative to the penalties. In this way, the risk threshold may be dynamically adjusted so as to reflect economic, technical, and contractual conditions.

If the risk threshold is not exceeded (block 110), then certain actions may be scheduled (block 112) based on the increased value of energy and the inputs 28 and 30. For example, the plant 10 may be allowed to operate at higher than usual limits (e.g., power production limits, equipment usage hours limits, maintenance interval limits) so as to capture increased revenue and/or aid in weather-related outages. For example, should a weather event (e.g., hurricane, blizzard, flood, tornado, earthquake) occur, or become forecasted, various scheduled actions 112 may be taken so as to minimize the weather event, such as continuing to operate power plants 10 that may have been otherwise shut down for maintenance. Likewise, plants 10 may be allowed to operate over certain limits (e.g., power production limits, equipment usage hours limits, maintenance interval limits) so as to provide needed power in the event of unexpected downtime in other plants 10, or due to economic conditions. In this way, energy markets (e.g., energy demand 165, energy cost 166), environmental conditions 174, and the status of other plants 162 may be monitored so as to derive a more optimal utilization of plant 10 resources. Further, the logic 100 may identify beneficial system upgrades in the plant(s) 10, as described in more detail below with respect to FIG. 9.

Figure 9:
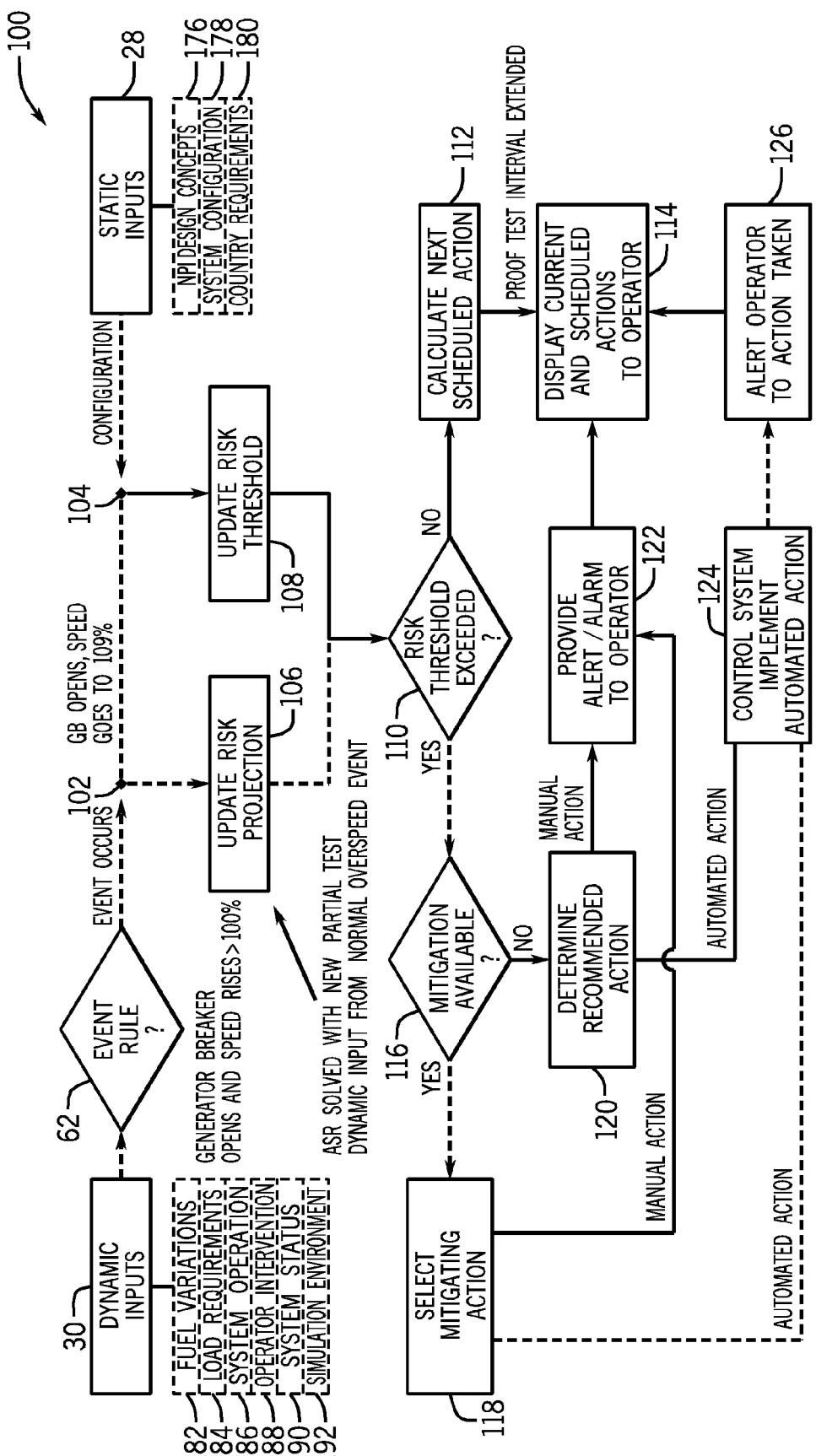
FIG. 9 is a flowchart illustrating an embodiment of the logic of FIG. 3 as applied to identifying beneficial system upgrades.

FIG. 9 depicts an embodiment of the logic 100 as applied to identifying beneficial system upgrades for the plant 10. For example, the plant 10 may be operating at approximately maximum capacity or near maximum capacity (e.g., 80%, 90%, 95%, 99% of capacity). Accordingly, it may be beneficial to increase the production capacity of the plant 10, for example, by replacing certain equipment 24 and/or instrumentation 26 with improved equipment 24 and/or instrumentation 26. Likewise, certain plant 10 equipment 24 and/or instrumentation 26 may be experiencing a number of unexpected maintenance events above a number of median or average events expected in equipment 24 and/or instrumentation 26 of the same type, age, and/or usage history. That is, the equipment 24 and/or instrumentation 26 may be failing more often than predicted. The logic 100 may advantageously derive events 102 related to upgrading the plant 10, and provide actions suitable for improving overall plant 10 efficiency.

In the depicted embodiment, the static inputs 28 may include new product introduction (NPI) design concepts 176, system configurations 178, and country requirements 180. The NPI design concepts 176 may include upcoming designs for equipment 24, instrumentation 26, and/or plant processes 22 suitable for improving plant 10 operations. For example, NPI modifications to the turbine system 80 may be identified, which may provide improvements in the operations, maintenance, and power production of the turbine system 80. The system configurations 178 may include current system configuration of the plant 10, and may thus provide for a baseline configuration from which to apply system upgrades. Country requirements 180 may include regulatory requirements for the plant 10 that vary from country to country. Additionally, the country requirements 180 may include other requirements, such as industrial code requirements, construction requirements, financing requirements, and the like, related to the country in which the plant 10 is operating.

The dynamic inputs 30 may include fuel variations 182, load requirements 184, system operations 186, operator intervention 188, system status 190, and/or simulation environments 192. The fuel variations 182 may be useful in determining what type of upgrades to equipment would better utilize available fuels. For example, New Product Introduction (NPI) designs 176 for coal-based fuels may result in an improved energy production while also reducing emission levels. The load requirements 184 may include a load percentage utilization for certain equipment 24, such as the turbine system 80. That is, the load percentage may approximate a desired percentage loading or use for running certain equipment, such as the generator 98. Higher load requirements 80 may correspond to more equipment 24 utilization which may result in a higher maintenance need. The system operation 186 may include data detailing how the system is to be operated, for example, what other systems may be interrelated for use as backups, the type, number, and training of the personnel overseeing the operations, typical firing temperatures, typical operating pressures, fuel and other flow rates, and the like. Operator intervention 188 may detail the type of manual intervention present in the plant 10 as well as the amount of time that the operator interacts with the plant 10 equipment 24 and/or instrumentation 26. The system status 190 may include the current operational status of the system (e.g., current power production levels, revenue generated month-to-month, associated costs, personnel turn-over). The simulation environments 192 may include statistical and/or physical models suitable for simulating the impact of upgrades to the plant 10. For example, the NPI design concepts 176 may be used as part of the simulations to gauge any beneficial impact. Likewise, the simulation environments 192 may include economic models suitable for deriving a cost-benefit analysis of procuring new equipment and/or instrumentation, including tax rebates (e.g., "green" technology rebates), amortization schedules, impact on stock valuations, and the like.

The logic 100 may be constantly monitoring the inputs 28 and 30 so as to identify beneficial system upgrades. For example, if new NPI designs 176 are created, then the logic 100 derive events 104 detailing the appearance of new NPI designs. The logic 100 may then run the simulation environment 192 to determine the engineering and economic suitability of implementing the NPI designs 176 in the plant 10. The logic 100 may also monitor events 102 such as generator trips, turbine trips, unexpected maintenance events (e.g., component failures) and the like, to track over-utilization of equipment 24 and/or instrumentation 26. Such over-utilization monitoring may result in the derivation of over-utilization events 102. Likewise, the monitor 100 may monitor underutilization of the equipment 24 and/or instrumentation 26, for example, by comparing current utilization metrics (usage hours, fired temperatures, power production, fuel usage, number of startups per year) against average or median utilization metrics. Accordingly, the logic 100 may identify over utilized and underutilized resources as candidates for replacement.

The logic 100 may update the risk projection (block 106) of replacing the equipment 24 and/or instrumentation 26 with newer designs, and compare the replacement risk against any updated risk threshold (block 108). Likewise, the risk of not upgrading the plant 10 resources may be used as a point of comparison. Should the risk threshold of upgrading the equipment not exceed the updated risk threshold (block 110), then a next scheduled action may be calculated (block 112) to include a schedule and list of equipment 24 and/or instrumentation 26 upgrades. In this way, the logic 100 may monitor inputs 28 and 30 so as to derive one or more upgrades to the plant 10 that may increase the plant's efficiency and production.

Figure 10:
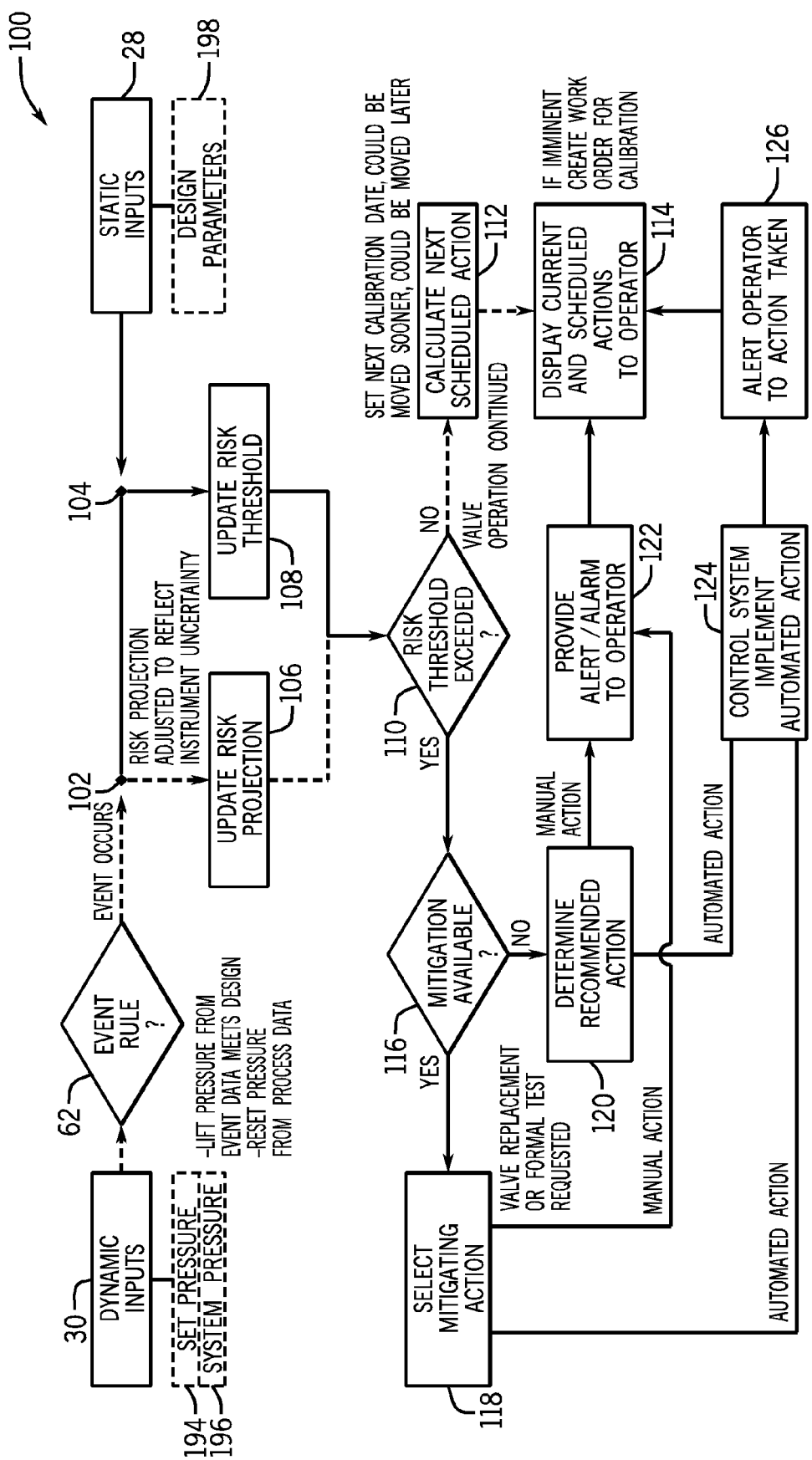
FIG. 10 is a flowchart illustrating an embodiment of the logic of FIG. 3 as applied to a testing of equipment.

FIG. 10 depicts an embodiment of the logic 100 as applied to monitoring inputs 28 and 30 related to an individual equipment 24 and/or instrumentation 26, such as a pressure relief valve, and using the monitored inputs to more efficiently to derive, for example, a new maintenance schedule and/or issue a new work order for the equipment 24 and/or instrumentation 26. Certain equipment 24, such as the pressure relief valve, may not be used very often. For example, the pressure relief valve is used to bypass or relieve a fluid flow when a pressure reaches a certain level. Accordingly, the pressure relief valve may not be used very often when compared to other valves. In order to insure reliability of the relief valve, maintenance tests may be scheduled that test for a desired valve behavior, such as opening or closing of the relief valve at certain pressure levels. However, the maintenance tests may offline the equipment 24, thus impacting the overall operations of the plant 10. The logic 100 may continuously monitor the inputs 28 and 30 for the occurrence of certain valve related events, such as a bypass event that causes the bypass valve to open and/or close. By monitoring data related to the bypass event, the logic 10 may derive that the valve is functioning properly, and "credit" the event in lieu of performing a valve test. Any scheduled valve tests may then be re-scheduled accordingly.

In the depicted example, the dynamic inputs 30 include a set pressure 194 of the pressure relief valve and a system pressure 196. The set pressure 194 may be adjusted so that the valve lifts or actuates when the set pressure 194 is reached, thus redirected fluid flow and preventing the system pressure 196 from reaching undesired levels. The logic 100 may continuously monitor the system pressure 196 and capture valve data during the occurrence of an overpressure event 102. For example event rules 62 such as "if current_system_pressure≥set_pressure," may be used to derive an occurrence of the overpressure event 102. Data related to the overpressure event, such as whether or not the pressure relief valve has lifted, an actuation time for the valve, and an actuation time for the valve reset (i.e., return of the valve to the original pre-overpressure position) may then be used to derive an updated risk projection (block 106). The updated risk projection may include the risk of re-scheduling valve maintenance events, such as overpressure test events, based on the observed performance of the valve during an actual overpressure condition. If the valve has performed within design parameters 198, then the risk threshold may not be exceeded (decision 110) and a calculation of the next scheduled action (block 112) may include a re-scheduling of any upcoming overpressure tests. The re-scheduling of the overpressure tests, as well as well as the data collated during observations of the overpressure event 102, may then be displayed to the operator (block 114). In this way, occurrences of actual plant 10 events 102 may be used to give "credit" in lieu of performing certain tests related to the events 102.

If the valve has not performed as desired, then the risk threshold of the valve not performing adequately may have been exceeded (decision 110). If the logic 100 determines that mitigation actions are available (decision 116), then certain mitigation actions may be selected (block 118). The mitigation actions may include actions, such as creating a work order for valve calibration, creating a work order for valve replacement, or creating a work order for the performance of additional valve tests. The logic 100 may provide manual mitigation actions (e.g., the work orders) (block 122) and display the work orders (block 114) to the operator. Accordingly, the logic 100 may enable the operator to more efficiently respond to variations in the dynamic inputs 30 that may indicate a need for corrective action. Indeed, individual equipment 24 and/or instrumentation 26, such as a pump, may be continuously monitored so improve operations, as described in more detail below with respect to FIG. 11.

Figure 11:
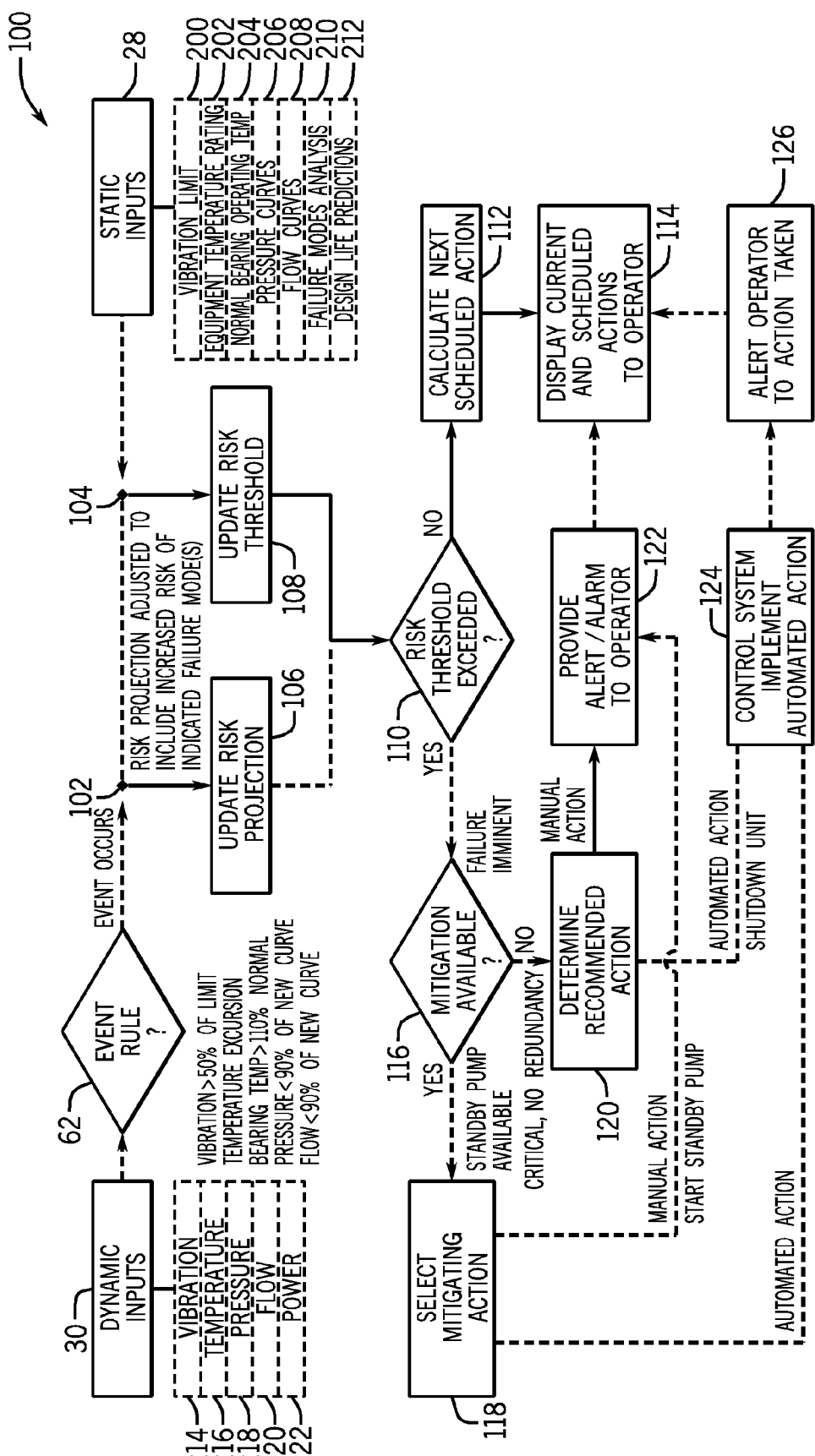
FIG. 11 is a flowchart illustrating an embodiment of the logic of FIG. 3 as applied to more efficiently operating equipment.

FIG. 11 is illustrative of an embodiment of the logic 100 as applied to the operations and maintenance of equipment 24, based on newly identified conditions. Certain equipment 24, such as a pump, may include static inputs 28 detailing design conditions, such as a vibration limit 200, an equipment temperature rating 202, a normal bearing operation temperature 204, pressure curves 208, and flow curves 210. The vibration limit 200 may include limits based on undesired levels of vibration. The equipment temperature rating 202 may include a desired operating temperature range for equipment suitable for improving the equipment's life and operational capabilities. Likewise, the normal bearing operating temperature 204 may include a desired range of temperature for operations of pump bearings (e.g., ball bearings, roller bearings). Additionally, the pressure curves 206 may detail a desired pressure for a given flow rate. Similarly, the flow curves 208 may detail a desired flow rate or flow percentage for a given valve opening position.

The static inputs 28 may also include failure mode analysis 210 and design life predictions 212. The failure mode analysis 210 may include statistical and/or physics-based models useful in predicting equipment failure based on certain dynamic inputs 30, such as current vibration 214, current temperature 216, current pressure 218, flow 220 (e.g., flow rate, flow percentage), and power 222 (e.g., drive power or torque). Similarly, the design life predictions 212 may be used to predict retirement or replacement for the equipment 24 based on the usage history of the equipment 24, such as hours used, type of usage, maintenance records, and so on. The logic 100 may combine the static inputs 28 with the dynamic inputs 30, such as the current vibration 214, temperature 216, pressure 218, flow, and/or power 222, so as to update a risk projection (block 106) related to the equipment 24. For example, a risk projection of equipment 24 failure or need for maintenance may be updated (block 106). The updated risk projection may include a risk of the valve malfunctioning or becoming otherwise inoperative, which may be derived by using, for example, the failure modes analysis 210 and/or design life predictions 212 (and other static inputs 28).

If the risk threshold of the valve malfunctioning is found to exceed the risk threshold (decision 110), then the logic 100 may determine if there are any mitigation actions available (decision 116). If there are mitigation actions available (decision 116), then the logic 100 may select one or more mitigation actions (block 118). For example, if a manual standby pump is available, then the logic 100 may provide an alert or an alarm to the operator (block 122) to start the standby pump, and then provide a display of the current action (e.g., action to start the standby pump) to the operator (block 114). Likewise, if a standby pump is available and under automated control, then the plant control system 58 may be directed to drive the standby pump (block 124), and alert the operator of the action just taken (block 126). The logic 100 may then display the current action (e.g., automated starting of the standby pump) to the operator (block 114).

If no mitigation action is available (decision 116) then the logic 100 may determine a recommended action (block 120). For example, if the pump is a critical pump, then the recommended action may include shutting down the system that is using the pump. The system shutdown may be automated or manual. On a manual shutdown, the logic 100 may provide an alert or an alarm to the operator (block 122) detailing the system shutdown. On an automated shutdown, the logic 100 may direct the plant control system 58 to shut down the system (block 124), and alert the operator of the shutdown action taken (block 126). The logic 100 may then display the shutdown action and related data to the operator (block 114). By continuously monitoring dynamic inputs 30 from the equipment 24, the logic 100 may derive maintenance and/or operational actions suitable for more efficiently operating the plant 10. In this way, possible failures to equipment 24 may be detected, and actions set in place to minimize or eliminate undesired effects of the failure. Indeed, possible failures to instrumentation 26, as described in more detail with respect to FIG. 12, may be detected and acted upon by the logic 100.

Figure 12:
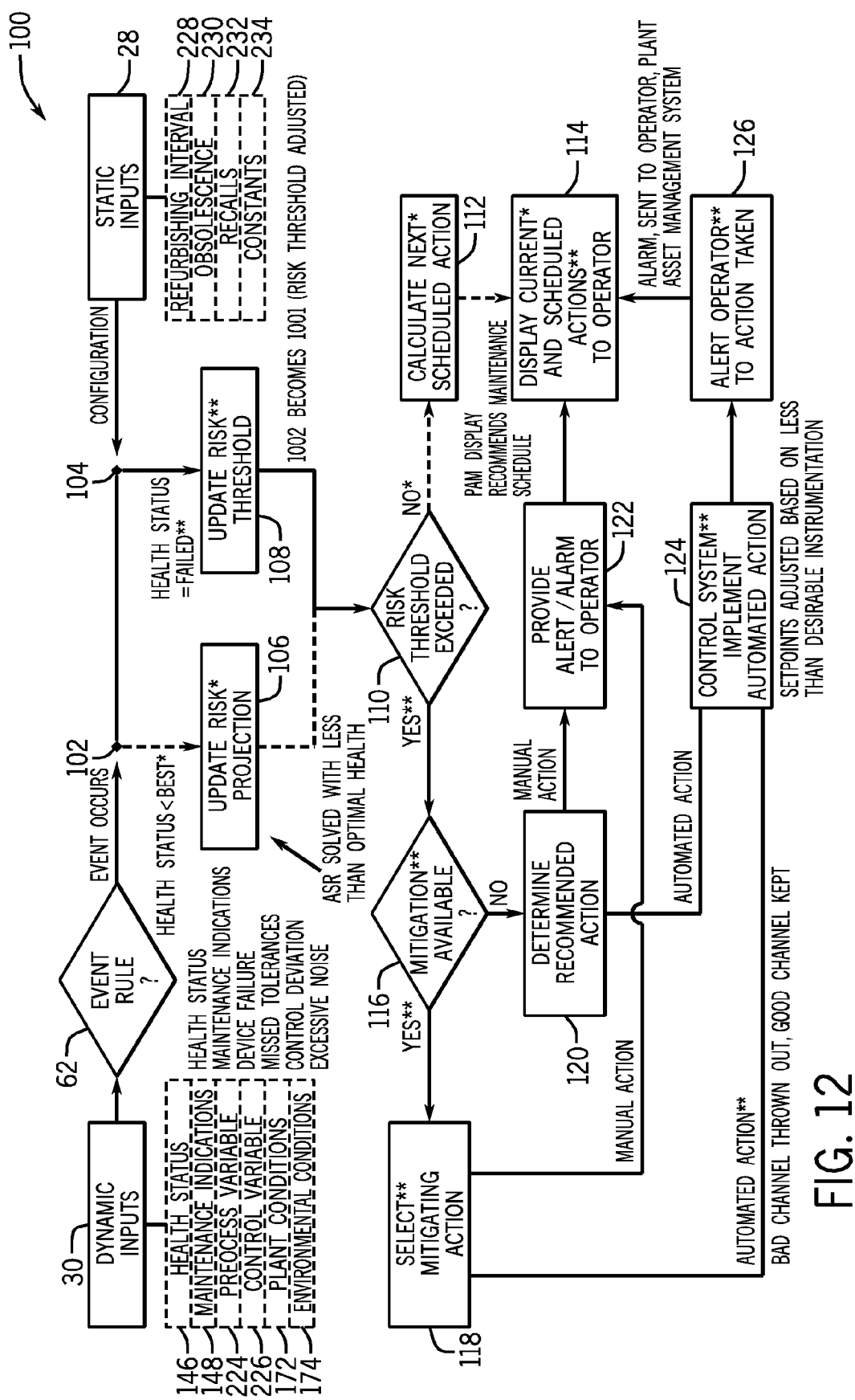
FIG. 12 is a flowchart illustrating an embodiment of the logic of FIG. 3 as applied to more efficiently using instrumentation.

FIG. 12 depicts an embodiment of the logic 100 as applied to monitoring the dynamic inputs 30 so as to detect and act upon indications of the instrumentation 26 becoming inoperative or failing. By providing for certain actions, such as using redundant instrumentation and/or redundant channels, the logic 100 may mitigate or eliminate effects associated with failed instrumentation 24. For example, the monitored dynamic inputs 30 may include the health status 146 of the instrumentation 26. As mentioned above with respect to FIG. 5, the health status 146 may be derived through visual inspection or may be automatically reported by the instrument 26. Indeed, the instrument 26 may include a variety of protocols, such as Hart, Foundation Fieldbus, Profibus, and the like, capable of communicating the health status with the control computer 16 and the plant control system 58. The health status 146 may be a binary status (i.e., healthy or unhealthy), or a range of health statuses 146 (e.g., approximately 100% healthy to 0% healthy). The health status 146 may also be a multi-bit health status 146, where each bit may correspond to different health statuses 146.

Maintenance indications 148 may also be included in the dynamic inputs 30. For example, maintenance logs for the instrumentation 26 and the related equipment 24 may be used, including paper and electronic logs, that detail maintenance performed, type of maintenance, issues, and the like. A process variable 224 may be used, that measures temperature, pressure, flow, clearances, or other process information. A control variable 226 may be used, for example, in situations where the instrumentation 26 uses control modalities such as proportional-integral-derivative (PID) techniques, closed loop control techniques, and/or open loop control techniques. The plant conditions 172 (e.g., status of plant equipment, personnel on leave, backup power production capacity), and environmental conditions 174 (e.g., current weather, forecasted weather) may also be monitored.

The static inputs 28 may include a refurbishment interval 228 detailing a schedule for refurbishment or maintenance of the instrumentation 26. An obsolescence input 230 may be used to detail a life cycle or obsolescence period for the instrumentation 26, useful in determining the remaining life for the instrumentation 26. Recalls 232 may be used to determine if any current manufacturer recalls or returns for the instrumentation 26 are in place, as well as a history of recalls or returns for the instrumentation 26. Accordingly, the static inputs 28 may be used to provide information useful in deriving a risk of instrumentation failure or of the instrumentation 26 transmitting erroneous measurements.

One or more event rules 62, such as rules detailing deviations from the desired control variable 226 (e.g., "if control_setpoint_variation>X % " where X % is approximately equal to 1%, 5%, 10%, 15%, 20%) may used to detect a health status event 102. Other event rules 62 may include rules relating to maintenance indications 148 (e.g., "if history_of_unexpected_maintenance=high", "last_maintenance>one_year"), process variable 224 (e.g., "if measurements>max_measurement_range", "if measurements<min_measurement_range"), and measurements transmitted by the instrumentation 26 (e.g., "if no_measurements_received>1 hour", "if measurement_data=noisy_data"), and the like. The instrumentation 26 may also provide for health status measurement 146. Indeed, certain "smart" instrumentation 26, such as Foundation Fieldbus instrumentation 26, may include self-analysis modes suitable for transmitting the health status 146. Accordingly, the logic 100 may derive, for example health status events 102, such as events detailing that the instrumentation 26 is unhealthy or may have failed.

The health status events 102 may be used to update a risk projection (block 106) of the impact of the failure on plant 10 operations, as well as to update a risk threshold (block 108). For example, if the instrumentation is included in the turbine system 80, then a risk projection of malfunction for the turbine system 80 may be found (block 106) by using the ASR process. Indeed, the risk projection of malfunction for any system that includes the instrumentation 80 may be updated (block 106) by using the dynamic inputs 30 and the static inputs 28. Likewise, a risk threshold or acceptable risk of malfunction may be updated (block 108). For example, if the instrumentation 26 is considered critical to operations of the plant 10, then the risk threshold may be lowered so as to reflect the importance of the instrumentation 26 in plant operations. Likewise, if the instrumentation 26 has backup instrumentation 26 or is not as important to plant 10 operations, then the risk threshold update may result in a lowered risk threshold (block 108).

If the logic 100 determines that a risk threshold of the instrumentation failing has been exceeded (decision 110), then the logic 100 may determine if there are possible mitigation actions (decision 116). If there are one or more mitigation actions, the logic 100 may then select one or more of the mitigation actions (block 118). For example, the instrumentation 26 may include two or more channels, and one of the channels may have been determined to be working within desired parameters. Accordingly, the selected mitigation action may include automatically using the working channel while the failing channel may be left unused. Indeed, the plant control system 58 may be directed to implement the automatic action of using the working channel (block 124), and an alert may then be sent to the operator of the action taken (block 126). If no mitigation action is available (decision 116), the logic 100 may determine a recommended manual action (block 120), such as replacing the instrumentation 26. Such action may then be provided to the operator as an alarm or alert (block 122). Further, the logic 100 may also provide an automated recommended action (block 122), such as directing the plant control system 48 to shutdown certain operations (block 124) if the instrumentation 26 is not replaced within a certain time limit. The automated action taken may then be provided as an alert to the operator (block 126). All alerts and related data (e.g., causes for the alerts), measurements used to derive the alerts) may then be displayed to the operator 114.

If the logic 100 decides that no risk threshold has been exceeded (block 110), for example, because the instrumentation is not critical or because the instrumentation 26 health status is approximately close to a healthy status, then the logic 100 may calculate a next scheduled action (block 112). The next scheduled action may include a recommended schedule for replacement of the instrumentation 26, as well as the data used in determining the instrumentation's health status (e.g., dynamic inputs 30). The next schedule action and related data may then be displayed to the operator (block 114). By continuously deriving health status events 102 for the instrumentation 26, and by using the inputs 28 and 30 to update risk projections (block 110) and risk threshold (block 108), the logic 100 may more optimally diagnose any issues arising out of malfunctioning instrumentation 26 and respond accordingly. Indeed, the logic 100 may also be used to monitor equipment 24 and/or instrumentation 26 indirectly, for example, through data being transmitted through an interrelated equipment 24 and/or instrumentation 26, as described in more detail below with respect to FIG. 13.

Figure 13:
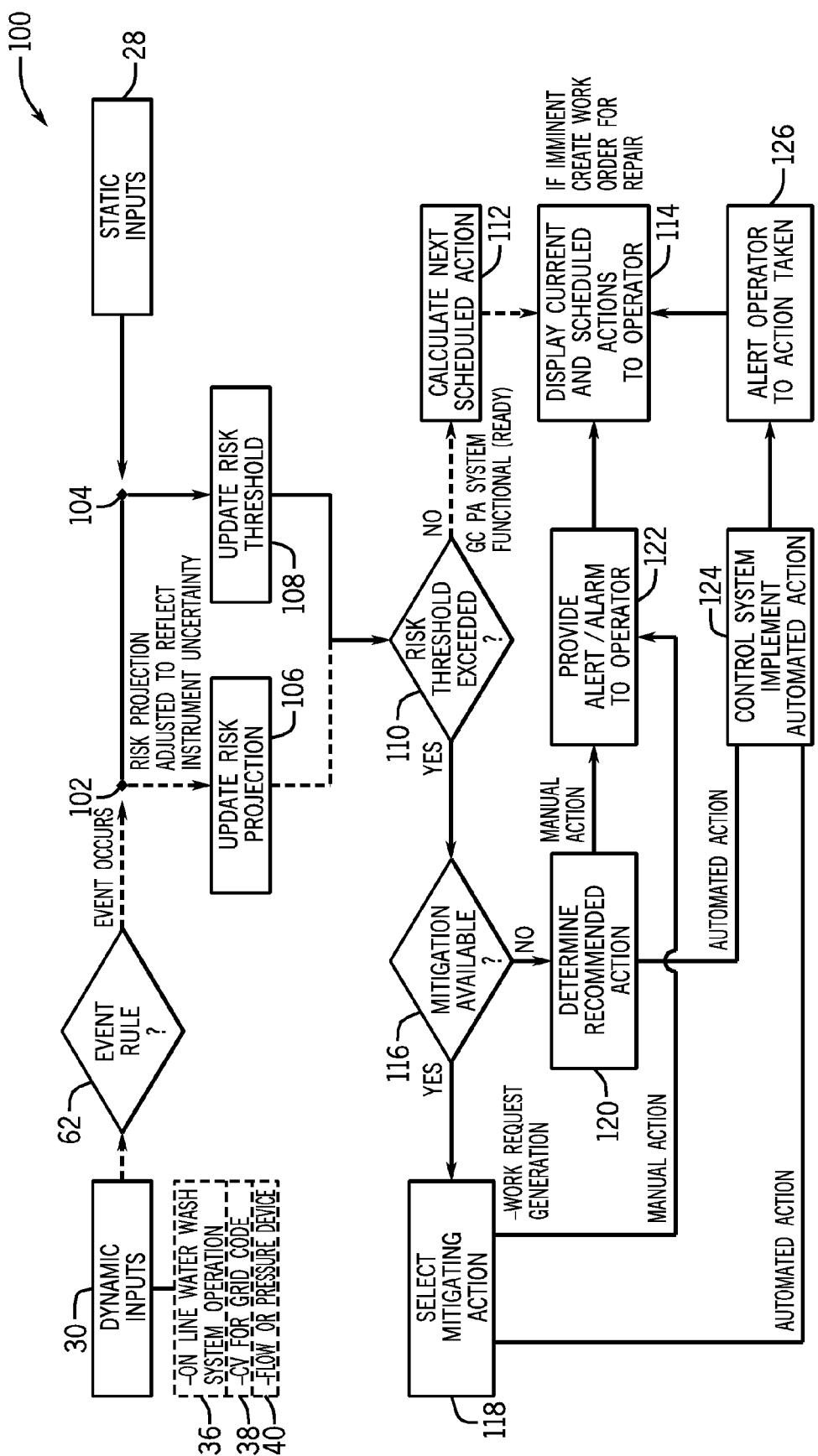
FIG. 13 is a flowchart illustrating an embodiment of the logic of FIG. 3 as applied to more efficiently inspecting equipment.

FIG. 13 depicts an embodiment of the logic 100 as applied to equipment 24 inspection, including deriving useful results from direct and/or indirect inspection of the equipment 24, and enable certain actions suitable for optimizing plant 10 operations. In one example, the inspected equipment 24 may include a power augmentation system, such as a water wash system suitable for "fogging" or adding vapor to the compressor 94. The added vapor enables a cooling of the compressor 94, as well as enhances mass flow by injecting an additional liquid mass flow, which may result in added power production from the turbine system 80. In certain operational modes, the power augmentation system may be switched on, for example, through the use of a grid code. For example, certain regulations 40 may detail that the power plant 10 respond to the grid code by adding power to the grid 99. Accordingly, the power plant 10 may turn on the power augmentation system so as to enhance power production.

In one embodiment, the operational behavior of the power augmentation system may be used in lieu of direct inspection of the power augmentation system. In this way, the power augmentation system may be observed indirectly. For example, dynamic inputs 30 gathered during use of the power augmentation system may be used to derive the occurrence of certain events 102 indicative of the reliability or the health of the power augmentation system, and a risk projection of continuing operations may be updated (block 106), along with a risk threshold (block 108). The logic 100 may then provide decisions suitable for enhancing the operations and improving the safety of the plant 10.

In the depicted embodiment, the dynamic inputs 30 may include data from an online power wash system operations 236 (e.g., vapor rate, compressor temperature, mass flow rate), valve (e.g., Cv valve) data 238 from a valve responsive to the grid code (e.g., current valve position, current flow through the valve, temperature of flow), and a flow or pressure device data 240 from a device such as pump that provides the flow or otherwise pressurizes the liquid that is used in power augmentation. The dynamic inputs 30 may be used with the event rules 62 to derive the occurrence of one or more events 102 impacting the power augmentation system. For example, some event rules may include rules that analyze the current dynamic inputs 30 and derive events 102 such as low mass flow, low pressure, high mass flow, high pressure, particulates in the flow, dirty flow, low or no power augmentation when the power wash is turned on, and the like, indicative of possible problems in the power augmentation system.

The occurrence of the events 102 may then result in an update of a risk projection (block 106) of continuing operations using the power augmentation system. For example, the Accident Scenario Review (ASR) or the Fault Tree Analysis (FTA) may be used to derive a new risk based on the dynamic inputs 30 (and static inputs 28). Likewise, the risk threshold of continuing plant operations may be updated or may be left at the same level (block 108), based on, for example, market demand for energy. If the risk threshold is exceeded (decision 110), then the logic 100 may determine if any mitigation actions are available (decision 116). If mitigation actions are available (decision 116), then the logic 100 may select one or more of the mitigation actions (block 118). For example, if the power augmentation system seems to be experiencing reliability issues and it is not expected to be needed in the near future (e.g., 1 day, 1 week, 1 month), then a manual mitigation action may include issuing a work order to repair and/or otherwise maintain the power augmentation system. The work order may be communicated as an alert or alarm (block 122), and subsequently the current action (and any other scheduled action) may be displayed to the operator (block 114).

Additionally or alternatively, and an automated mitigation action may be provided, such as issuing an automated bid for alternate power production services so as to respond to any requests for added power. If no mitigation actions are available, then the logic 100 may determine certain recommended actions (block 120), such as shutting down the turbine system 80. The recommendation actions may be manual or automatic. Manual actions may be provided first as operator alerts or alarms (block 120), followed by displaying of pertinent action information to the operator (block 114). Automated actions may be communicated to the control system 58 for implementation (block 124), followed by an alert of the action taken (block 126), which may subsequently include displays of the current action and data related to the current action to the operator (block 114). By monitoring inputs 28 and 30 in lieu of direct inspections, the logic 100 may provide decisions useful in maintaining an improved reliability and operational efficiency of equipment 24. Indeed, the logic 100 may also enable a prioritization of the decisions and corresponding actions, for example, to lessen (or to increase) the impact of the actions in operations of the plant 10, as described in more detail below with respect to FIG. 14.

Figure 14:
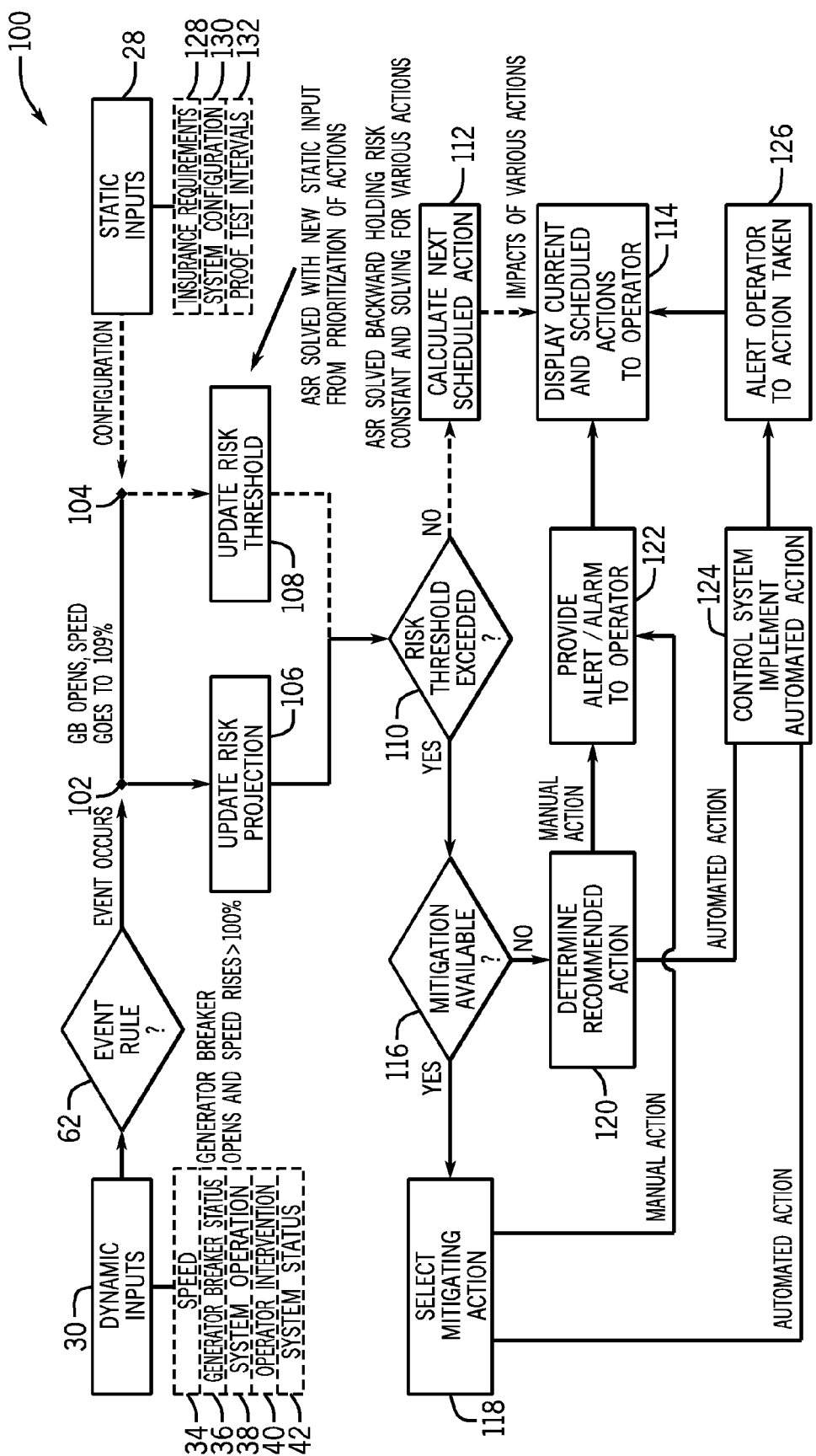
FIG. 14 is a flowchart illustrating an embodiment of the logic of FIG. 3 as applied to the prioritization of actions affecting plant operations.

FIG. 14 is illustrative of an embodiment of the logic 100 as applied to prioritizing a relative value or an impact of actions affecting plant 10 operations. That is, the logic 100 may enable not only a derivation of certain actions, but also prioritize the actions, for example, based on the impact that the actions may have on operations of the plant 10. In the depicted example, a system, such as the turbine 80 overspeed protection system may be used as an example, but it is to be noted that any system in the plant 10 may be advantageously monitored by the logic 100. Indeed, the logic 100, as described in FIGS. 3-14, may be used in any system of the plant 10.

By using the static inputs 28, including any new static inputs 28, the logic 100 may update all risk thresholds for each available input 30 (block 108). More specifically, each input 30 may be assigned to one or more risk thresholds associated with the input. For example, the speed 134 input may be assigned to a risk threshold of turbine system 80 failure and to a risk threshold of plant failure 10. The updating of the risk thresholds (block 108) may include performing the ASR process by using all of the static inputs 28, including any new inputs, and by prioritizing certain actions. For example, if the plant 10 is located in a hurricane-prone area having high insurance requirements 128, then the updating of the risk thresholds (block 108) through the ASR process may include prioritizing hurricane-related elements during the ASR process. Any elements of the ASR process may be prioritized according to desired actions, such as giving preference to a branch in the ASR flowchart over another branch. Likewise, a node in the ASR flowchart, such as a risk node, may have the risk score changed according to prioritization of actions, to reflect a higher or lower priority. In this way, the risk thresholds may be updated (block 108) to incorporate certain desired priorities.

As depicted, the static inputs 28 may include insurance requirements 128 (e.g., perform full load rejection test once per year), system configuration 130, and proof test intervals or schedules 132. The dynamic inputs 30 may include turbine speed inputs 134, a status of the generator breaker 136 (e.g., open or closed), turbine system operation information 138 (e.g., system is ramping up, system is ramping down), an operation intervention information 140 (e.g., operator is manually setting valve positions), and overall system status 142 (e.g., power produced, weather conditions). The event rules 62 may derive that a full load rejection event 102 is occurring based on the generator breaker has trip and an increase in turbine speed measured at over 100% of the desired speed (e.g., current speed may be measured at 109% of desired speed). By using the dynamic and static inputs 30 and 28, the logic 100 may update the risk projection (block 106) of continuing operations with the current overspeed protection system and related components (e.g., bypass valves, piping, hydraulic controller). For example, in a successful full load rejection event 102, the updated risk is likely to not exceed the risk threshold (decision 110) of continuing operations with the current equipment (e.g., turbine system 80).

The logic 100 may update the risk projection (block 106) as described above with respect to FIG. 4. That is, the dynamic inputs 30 and the static inputs 28, including any new static inputs 28, may be used to derive a risk projection representative of, for example, the probability of failure of the turbine system 80 or the plant 10. If the risk threshold is not exceeded (decision 110), then the logic 100 may calculate the next scheduled action (block 112). In a successful full load rejection event 102, the updated risk is likely to not exceed the risk threshold (decision 110) of continuing operations with the current equipment (e.g., turbine system 80). Accordingly, the logic 100 may calculate the next scheduled action 112. For example, the ASR process may be used "backwards" by holding the projected risks constant and solving the ASR flowchart in reverse to arrive at one or more actions. The impact of the various actions may then be displayed to the operator 114. In this way, the logic 100 may incorporate desired prioritizations.

Technical effects of the invention include the ability to detect the occurrence of certain unexpected events and "credit" the event occurrence in lieu of performing scheduled tests. Technical effects also include the derivation of decisions for improving the testing of equipment protection systems, the testing of pressure relief valve operations, the calibration of instrumentation, the replacement of instrumentation, the performance of equipment inspection, the performance of equipment maintenance, the risk of equipment failure during a specified time, the performance of equipment operations to maintain desired reliability levels, the timing of testing, operational, and calibration procedures to maintain desired reliability levels, the identification of beneficial system upgrades, and the prioritization of values.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a risk calculation system programmed to calculate a risk based on a static input and a dynamic input; and
a decision support system programmed to use the risk to derive a decision; and
a plant control system programmed to update operations of a plant based on the decision, to observe a plant system, and to store plant system observations as historical data, wherein the decision predicts future plant conditions, wherein the static input comprises a business environment data, wherein the dynamic input comprises a signal representative of an unexpected maintenance event, and wherein the plant control system is configured to analyze the signal representative of the unexpected maintenance event and the historical data to credit the unexpected maintenance event in lieu of performing an equipment test event related to the plant system.

2. The system of claim 1, wherein the static input comprises a design data, a manufacturing data, a plant configuration, a failure mode analysis, a regulation, a margin for unknown factors, or a combination thereof.

3. The system of claim 1, wherein the dynamic input comprises a plant instrumentation input, a plant equipment input, a plant external independent systems data, a business environment input, an external systems input, a replacement of unknown factors input, or a combination thereof.

4. The system of claim 1, comprising a data highway communicatively coupled to the plant, the plant control system, the risk calculation system, the decision support system, and wherein the data highway is configured to enable communication among the plant, the plant control system, the risk calculation system, and the decision support system.

5. The system of claim 1, wherein the decision support system is configured to communicate the decision to the plant control system, and wherein the plant control system is configured to execute an action based on the decision.

6. The system of claim 1, wherein the decision support system is configured to use an event rule, a mitigation action algorithm, a recommended action algorithm, a risk calculation algorithm, a failure prediction algorithm, a model updating algorithm, an action scheduling algorithm, or a combination thereof, to derive the decision.

7. The system of claim 6, wherein the decision comprises a test equipment protection decision, a test valve operation decision, an instrument calibration decision, an instrument replacement decision, an equipment inspection decision, an equipment maintenance decision, a risk of failure decision, a maintenance of compliance decision, a maintenance of reliability decision, a timing decision, an identification of beneficial upgrades decision, a prioritization of relative values decision, or a combination thereof.

8. The system of claim 1, wherein the plant control system comprises a distributed control system (DCS), a manufacturing execution system (MES), a supervisor control and data acquisition (SCADA) system, a human machine interface (HMI) system, or a combination thereof.

9. The system of claim 1, wherein the plant comprises a power plant, a chemical plant, a refinery, a manufacturing plant, or a combination thereof.

10. A method, comprising:
observing a plant system via a plant control system;
storing plant system observations as historical data via the plant control system;
determining, via the plant control system, an occurrence of an event based on an event rule and a dynamic input associated with at least one component of a plant wherein the event comprises an unexpected maintenance event; and
responding, via the plant control system, to the occurrence of the event, if the event occurs, wherein responding comprises:
updating a risk projection based on at least one dynamic input;
updating a risk threshold based on at least one static input;
determining whether the risk projection exceeds the risk threshold;
determining a first action if the risk projection exceeds the risk threshold, wherein determining the first action comprises selecting a mitigation action as the first action if one or more mitigation actions are available, or determining a recommended action as the first action if no mitigation actions are available;
determining a second action if the risk projection does not exceed the risk threshold, wherein determining the second action comprises calculating a next scheduled action as the second action, wherein the mitigation action comprises using a backup component configured to operate as a backup to the at least one component; and
analyzing, via the plant control system, the unexpected maintenance event and the historical data to credit the unexpected maintenance event in lieu of performing an equipment test event related to the plant system.

11. The method of claim 10, wherein the event comprises an equipment protection system test event, and updating the risk projection comprises updating a risk of rescheduling an equipment testing interval.

12. The method of claim 10, wherein the event comprises an instrumentation event, and updating the risk projection comprises at least one of updating a risk of using an uncalibrated instrument or updating a risk of using an instrument having a lower performance.

13. The method of claim 10, wherein the event comprises at least one of an equipment operation event, an equipment inspection event, or an equipment maintenance event, wherein updating the risk projection comprises updating a risk of equipment failure.

14. The method of claim 10, wherein the event comprises an instrumentation event, and updating the risk projection comprises at least one of updating a risk of rescheduling a calibration for an instrument or updating a risk of rescheduling a replacement for the instrument.

15. The method of claim 10, wherein the event comprises at least one of an equipment operation event, an equipment inspection event, an instrumentation event or an equipment maintenance event, wherein updating the risk projection comprises at least one of updating a risk of rescheduling an equipment maintenance or updating a risk of rescheduling an equipment inspection.

16. The method of claim 10, wherein the event comprises at least one of an equipment protection system test event, an instrumentation event, an equipment operation event, an equipment inspection event, or an equipment maintenance event, wherein updating the risk projection comprises updating a risk of upgrading a system configuration.

17. The method of claim 10, comprising maintaining, via the plant control system, a plant reliability level, wherein the static inputs comprise at least one of a reliability model, a failure mode analysis, a design life prediction, an industry failure rate, or an operating configuration.

18. The method of claim 17, wherein updating the risk projection comprises at least one of updating a risk of performing an equipment operation to maintain the plant reliability level, updating a risk of performing an equipment maintenance to maintain the plant reliability level, or updating a risk of performing an equipment replacement to maintain the plant reliability level.

19. The method of claim 10, wherein the first action comprises an automatic action, a manual action, or a combination thereof.

20. A system comprising:
a power plant controller programmed to receive dynamic inputs and static inputs related to a power plant, to observe a plant system, and to store plant system observations as historical data, wherein the power plant controller is programmed to derive a decision impacting power plant operations, the power plant controller is programmed to determine when a test of a component of the power plant is recommended based on monitoring the dynamic and static inputs and the historical data, the power plant controller is programmed to identify an occurrence of an unexpected maintenance event related to the test, the plant controller is programmed to analyze the unexpected maintenance event and the historical data to credit the unexpected maintenance event in lieu of performing an equipment test, and the power plant controller is programmed to adjust a test schedule based on the credit.

21. The system of claim 20, wherein the component comprises a turbine system configured to provide electrical power, mechanical power, or a combination thereof.

22. The system of claim 20, wherein the test comprises a proof test configured to test a suitability of the component in performing plant operations.

\* \* \* \* \*